(12) United States Patent
Tracz et al.

(10) Patent No.: US 10,863,015 B2
(45) Date of Patent: Dec. 8, 2020

(54) ELECTRONIC DEVICE AND METHOD FOR CONTROLLING CALL FUNCTION

(71) Applicant: Samsung Electronics Co., Ltd., Suwon-si (KR)

(72) Inventors: Pawel Tracz, Lodz (PL); Grzegorz Pawal Grzesiak, Warsaw (PL); Lukasz Dominik Kornatowski, Lodz (PL); Anton Komlev, Warsaw (PL); Antoni Jakubiak, Grojec (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/477,848

(22) PCT Filed: Jan. 12, 2018

(86) PCT No.: PCT/KR2018/000626
§ 371 (c)(1),
(2) Date: Jul. 12, 2019

(87) PCT Pub. No.: WO2018/131938
PCT Pub. Date: Jul. 19, 2018

(65) Prior Publication Data
US 2019/0373094 A1    Dec. 5, 2019

(30) Foreign Application Priority Data

Jan. 12, 2017 (KR) .......................... 10-2017-0005365

(51) Int. Cl.
*H04M 1/60* (2006.01)
*H04M 1/725* (2006.01)

(52) U.S. Cl.
CPC ....... *H04M 1/605* (2013.01); *H04M 1/72569* (2013.01)

(58) Field of Classification Search
CPC .. H04M 1/72527; H04W 84/12; H04W 4/023
See application file for complete search history.

(56) References Cited

U.S. PATENT DOCUMENTS

| 6,853,850 | B2 | 2/2005 | Shim et al. |
| 8,682,388 | B2 | 3/2014 | Vuppu et al. |

(Continued)

FOREIGN PATENT DOCUMENTS

| KR | 10-2005-0120390 A | 12/2005 |
| KR | 10-2007-0006958 A | 1/2007 |
| KR | 10-2010-0041501 A | 4/2010 |
| KR | 10-2013-0084794 A | 7/2013 |
| KR | 10-2015-0048065 A | 5/2015 |

OTHER PUBLICATIONS

ISA/KR, "International Search Report and Written Opinion of the International Searching Authority," International Application No. PCT/KR2018/000626, dated Apr. 26, 2018, 11 pages.

(Continued)

*Primary Examiner* — Sam Bhattacharya

(57) ABSTRACT

An electronic device according to various embodiments in the present disclosure may comprise a modem, at least one sensor, and at least one processor which is connected with the modem and the at least one sensor and configured to control: determining the distance between the electronic device and a user thereof during the execution of a call application; determining the output intensity of sound data received from another electronic device connected through the call application, as an output intensity corresponding to the determined distance; and outputting the sound data at the determined output intensity.

22 Claims, 17 Drawing Sheets

(56) References Cited

U.S. PATENT DOCUMENTS

| | | |
|---|---|---|
| 2002/0068537 A1 | 6/2002 | Shim et al. |
| 2002/0198004 A1 | 12/2002 | Heie et al. |
| 2005/0026568 A1 | 2/2005 | Hawker et al. |
| 2009/0209293 A1 | 8/2009 | Louch |
| 2012/0058803 A1 | 3/2012 | Nicholson |
| 2012/0059579 A1 | 3/2012 | Pierfelice et al. |
| 2016/0178388 A1 | 6/2016 | Yi et al. |

OTHER PUBLICATIONS

Campbell, Mikey, "Apple patent automatically adjusts iPhone speaker volume based on proximity," Apple Insider, May 28, 2013, 2 pages. https://appleinsider.com/articles/13/05/28/apple-patent-automatically-adjusts-iphone-speaker-volume-based-on-proximity.

Felznestein, Arik, "Auto Speaker apk," APKMonk, Apr. 13, 2015, 2 pages. https://www.apkmonk.com/app/com.swarly.autospeaker/.

Mundhra, Ashish, "2 Android Apps to Automatically Lower or Increase Ringtone Volume," Guiding Tech, Apr. 5, 2013, 4 pages https://www.guidingtech.com/21130/android-automatically-increase-lower-ringtone-volume/.

Tapper, Evan, "Car Mode 1.3.1 APK," APKsHub, Feb. 11, 2017, 1 page. https://www.apkshub.com/app/com.schwimmer.android.carmode.

"ProXimity Talk 1.34 APK," APKsHub, Sep. 18, 2016, 2 pages. https://www.apkshub.com/app.com.insadco.proximitytalk.

European Patent Office, "Supplementary Partial European Search Report," Application No. EP18738704.8, dated Oct. 7, 2019, 11 pages.

Supplementary European Search Report in connection with European Application No. 18738704.8 dated Jan. 20, 2020, 11 pages.

ELECTRONIC DEVICE AND METHOD FOR CONTROLLING CALL FUNCTION

CROSS-REFERENCE TO RELATED APPLICATIONS

This application is a 371 National Stage of International Application No. PCT/KR2018/000626, filed Jan. 12, 2018, which claims priority to Korean Patent Application No. 10-2017-0005365, filed Jan. 12, 2017, the disclosures of which are herein incorporated by reference in their entirety.

BACKGROUND

1. Field

The disclosure generally relates to an electronic device and, more particularly, to an electronic device and a method for controlling a call function.

2. Description of Related Art

Electronic devices, such as a smart phone and a wearable device, having various functions for enhancing the convenience of users are widely used. A user using such an electronic device performs a different operation while making a call to another user. Generally, an operation performed simultaneously with a call function requires more complex inputs than those associated with the call function. Therefore, a solution for simplifying inputs associated with the call function is required to enable the user to conveniently perform multi-tasking.

Meanwhile, with the development of mobile communication, a user performs communication using an electronic device in an environment externally exposed. In this environment, the privacy of a user that makes a call using an electronic device may be violated. Accordingly, there is a need for a method for ensuring the privacy of a user making a call.

SUMMARY

With this background, various embodiments of the disclosure may provide an electronic device and an operating method for controlling a call function to simplify inputs related to the call function or to ensure the privacy of a user.

An electronic device according to various embodiments of the disclosure may include: a modem; at least one sensor; and at least one processor configured to be connected to the modem and the at least one sensor, to determine the distance between the electronic device and a user of the electronic device during execution of a call application, to determine the output strength of audio data received from a different electronic device connected via the call application as an output strength corresponding to the determined distance, and to control outputting the audio data with the determined output strength.

A method of an electronic device according to various embodiments of the disclosure may include: determining the distance between the electronic device and a user of the electronic device during execution of a call application; determining the output strength of audio data received from a different electronic device connected via the call application as an output strength corresponding to the determined distance; and outputting the audio data with the determined output strength.

An electronic device and a method thereof according to various embodiments of the disclosure may control a call function, thereby improving the convenience of users.

Effects which can be acquired by the disclosure are not limited to the above described effects, and other effects that have not been mentioned may be clearly understood by those skilled in the art from the following description.

DETAILED DESCRIPTION

Figure 1:
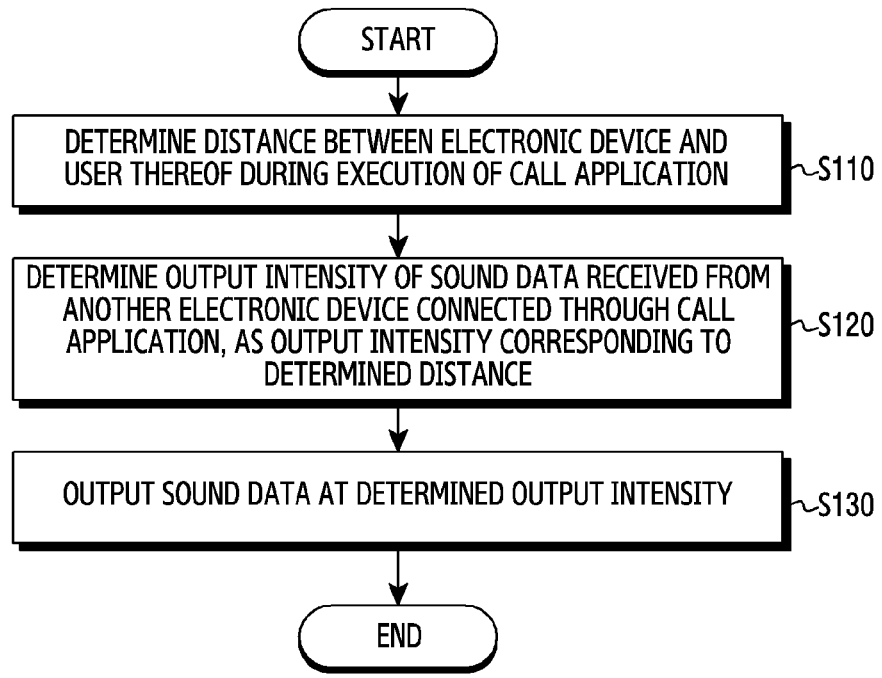
FIG. 1 illustrates an example of the operation flow of an electronic device according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the disclosure is not limited to the above described devices. In the disclosure, the term "user" may indicate a person using an electronic device or a device (e.g., an artificial intelligence electronic device) using an electronic device.

A user performs an operation while making a call with another user using an electronic device, such as a smartphone or a wearable device. For example, the user performs an operation, such as retrieving a web page or checking an email, while making a call with another user. Input required to perform such an operation is generally more complex than input required to make a call with another user. Therefore, a solution for controlling a call function to reduce input associated with a call in the electronic device is required in order to facilitate the operation while making a call with another user.

Wireless communication technology enables a user using an electronic device to freely make a call with another user any place where a mobile communication network is established. This aspect may ensure the mobility of the user but may not guarantee the privacy of the user. Therefore, there is a need for a method for controlling a call function to ensure the privacy of a user.

As described herein, an electronic device according to various embodiments of the disclosure may be a device that is portable. For example, the electronic device may be a mobile phone, a smartphone, a music player, a portable game console, a navigation system, a laptop computer, a wearable device, or the like. The electronic device may also be referred to as a terminal, a mobile station, a station (STA), or user equipment.

The electronic device may communicate with a different electronic device. The different electronic device may be a fixed device. For example, the different electronic device may be a relay node, such as an Access Point (AP) or a base station. Further, the different electronic device may be a portable device, such as the electronic device.

A communication path between the electronic device and the different electronic device may be set to various types. For example, the communication path may be a path including a relay node or may be a path not requiring a relay node.

FIG. 1 illustrates an example of the operation flow of an electronic device according to various embodiments of the disclosure.

Referring to FIG. 1, in operation S110, the electronic device may determine the distance between the electronic device and a user of the electronic device during the execution of a call application. The call application may be a program installed in the electronic device to assist a call with a user of a different electronic device. The call application may be installed before the release of the electronic device or may be installed after the release of the electronic device.

The electronic device may determine the distance between the electronic device and the user on the basis of data detected via at least one sensor included in the electronic device during the execution of the call application. For example, the electronic device may determine the distance between the electronic device and the user on the basis of data detected via a proximity sensor included in the electronic device. In another example, the electronic device may determine the distance between the electronic device and the user on the basis of data detected via an infrared sensor included in the electronic device. In still another example, the electronic device may determine the distance between the electronic device and the user on the basis of data detected via an image sensor included in the electronic device. In yet another example, the electronic device may determine the distance between the electronic device and the user on the basis of data detected via a thermal sensor included in the electronic device.

The at least one sensor may be activated by various methods. In some embodiments, the at least one sensor may be activated when the execution of the call application is initiated. In some other embodiments, the at least one sensor may be activated after a designated time has elapsed since the initiation of the call application. In some other embodiments, the at least one sensor may be activated by various other conditions (for example, the battery state of the electronic device) regardless of the execution of the call application.

The at least one sensor may be deactivated by various methods. In some embodiments, the at least one sensor may be deactivated when the executed call application is terminated or ceased. In some other embodiments, the at least one sensor may be deactivated after a designated time has elapsed since the termination of the call application. In some other embodiments, the at least one sensor may be deactivated by various other conditions (for example, the battery state of the electronic device) regardless of the execution of the call application.

The electronic device may determine the distance between the electronic device and a particular body part of the user of the electronic device. For example, when the electronic device is a smartwatch worn on the user's wrist, the electronic device may determine the distance between the user's ear and the electronic device, instead of the distance between the user's wrist and the electronic device, during the execution of the call application.

The electronic device may also determine the distance between the user of the electronic device and a particular part of the electronic device. For example, the electronic device may determine the distance between the user of the electronic device and one of a receiver, a speaker, or a microphone of the electronic device.

In operation S120, the electronic device may determine the output strength of audio data received from the different electronic device connected via the call application as an output strength corresponding to the determined distance. The output strength may be defined as a different value depending on the component of the electronic device that outputs the audio data. For example, the output strength determined by the electronic device in the case where the component of the electronic device that outputs the audio data is a receiver may be different from the output strength determined by the electronic device in the case where the component of the electronic device that outputs the audio data is a speaker.

In some embodiments, the electronic device may determine, using a table previously stored in the electronic device, the output strength of the audio data received from the different electronic device connected via the call application as the output strength corresponding to the determined distance. The table may include information indicating a relationship between distance and output strength. For example, the table include information indicating that the output strength corresponding to the determined distance X is A (dB) when the determined distance X is 0<X≤5 (cm), the output strength corresponding to the determined distance X is B (dB) when the determined distance X is 5<X≤10 (cm), and the output strength corresponding to the determined distance X is C (dB) when the determined distance X is 10<X≤15 (cm). In this example, when the determined distance is 7 (cm), the electronic device may determine the output strength of the audio data received from the different electronic device connected via the call application as the output strength B (dB) corresponding to the determined distance of 7 (cm).

In some other embodiments, the electronic device may determine, using an equation or an algorithm previously stored in the electronic device, the output strength of the audio data received from the different electronic device connected via the call application as the output strength corresponding to the determined distance.

In operation S130, the electronic device may output the audio data received from the different electronic device connected via the call application with the determined output strength. The electronic device may determine a component of the electronic device through which the audio data is output on the basis of the mode of the call application. For example, when the mode of the call application is a normal mode, the electronic device may output the audio data through the receiver of the electronic device. In another example, when the mode of the call application is a speakerphone mode, the electronic device may output the audio data through the speaker of the electronic device.

As described above, the electronic device according to various embodiments of the disclosure may control the output strength of the audio data received from the different electronic device on the basis of the distance between the user and the electronic device without any input to control the output strength of the audio data. Further, since the electronic device according to various embodiments of the disclosure does not require any input to control the output strength of the audio data, the user using the electronic device may secure more resources for performing an operation that is performed simultaneously with a call than a user using a general electronic device.

Figure 2A:
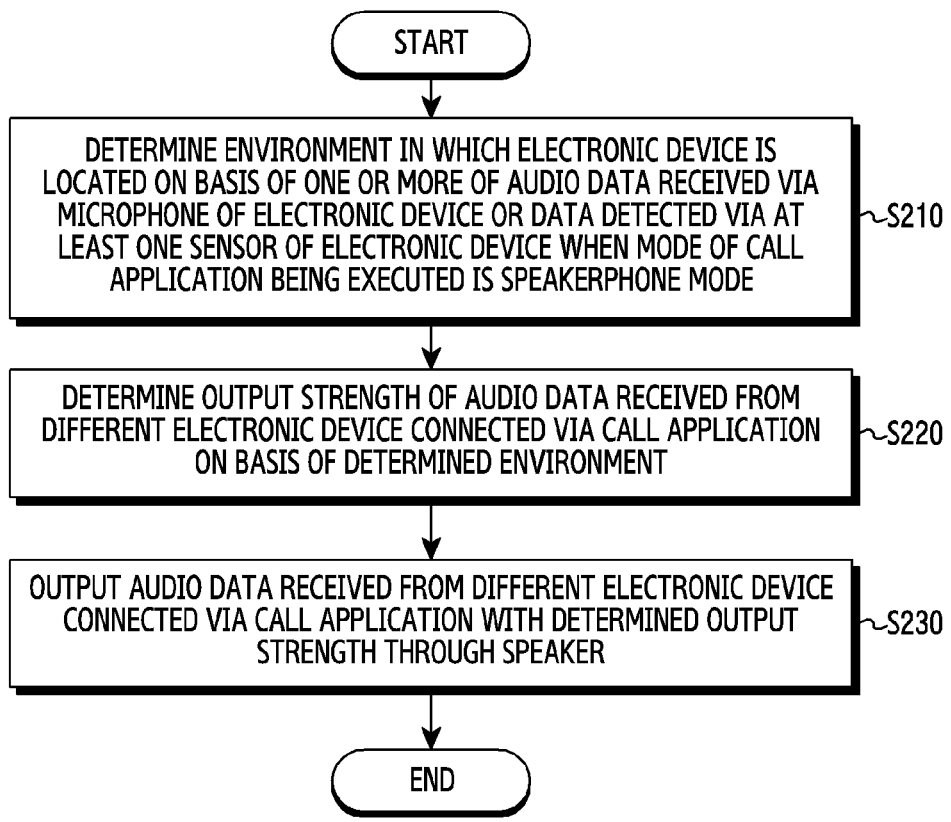
FIG. 2A illustrates an example of the operation of an electronic device controlling the output strength of audio data received from a different electronic device according to various embodiments of the disclosure.

FIG. 2A illustrates an example of the operation of an electronic device controlling the output strength of audio data received from a different electronic device according to various embodiments of the disclosure.

Referring to FIG. 2A, in operation S210, when the mode of a call application being executed is a speakerphone mode, the electronic device may determine an environment in which the electronic device is located on the basis of one or more of audio data received via a microphone of the electronic device or data detected via at least one sensor of the electronic device. The speakerphone mode may be a mode in which audio data received from a different electronic device connected via the call application is output via through a speaker of the electronic device.

In some embodiments, the electronic device may determine an environment in which the electronic device is located by analyzing audio data received via the microphone of the electronic device. For example, the electronic device may identify, on the basis of the analysis, that the audio data received via the microphone of the electronic device includes the sound of a subway passing, a shout from a crowd, or the like. The electronic device may determine, on the basis of the identified sound, that the electronic device is located in an environment including a subway or in an environment where a crowd gathers. In another example, the electronic device may separate the audio data received via the microphone of the electronic device into a speaker's voice and noise from on the basis of the analysis. The electronic device may determine an environment in which the electronic device is located on the basis of the level of the noise.

In some other embodiments, the electronic device may determine an environment in which the electronic device is located on the basis of data indicating the location of the electronic device detected by the at least one sensor of the electronic device. For example, the electronic device may determine an environment in which the electronic device is located on the basis of coordinates obtained by a Global Positioning System (GPS) of the electronic device. The at least one sensor may be activated by various methods. In some embodiments, the at least one sensor may be activated when the mode of the call application is switched to the speakerphone mode. In some other embodiments, the at least one sensor may be activated after a designated time has elapsed since the switch of the mode of the call application to the speakerphone mode. In some other embodiments, the at least one sensor may be activated by various other conditions (for example, the battery state of the electronic device) regardless of whether the mode of the call application is switched to the speakerphone mode.

The at least one sensor may be deactivated by various methods. In some embodiments, the at least one sensor may be deactivated when the speakerphone mode of the call application is terminated. In some other embodiments, the at least one sensor may be deactivated after a designated time has elapsed since the termination of the speakerphone mode of the call application. In some other embodiments, the at least one sensor may be deactivated by various other conditions (for example, the battery state of the electronic device) regardless of the mode of the call application.

In operation S220, the electronic device may determine the output strength of the audio data received from the different electronic device connected via the call application on the basis of the determined environment. For example, when the determined environment is an environment having a relatively high level of noise, the electronic device may set the output strength of the audio data to a relatively high value. In another example, when the determined environment is an environment having a relatively low level of noise, the electronic device may set the output strength of the audio data to a relatively low value.

In some embodiments, the electronic device may determine the output strength of the audio data in consideration of not only the determined environment but also the distance between the electronic device and the user of the electronic device.

In operation S230, the electronic device may output the audio data received from the different electronic device connected via the call application with the determined output strength through a speaker of the electronic device.

Although FIG. 2A illustrates the operation of the electronic device in the case where the mode of the call application is the speaker mode, this operation is provided only for illustrative purposes. The electronic device according to various embodiments of the disclosure may also perform operations similar to those illustrated in FIG. 2A in the case where the mode of the call application is a normal mode.

As described above, the electronic device according to various embodiments of the disclosure may determine an environment in which the electronic device is located and may determine the output strength of audio data received from a different electronic device on the basis of the determined environment, thereby adaptively adjusting the output strength of the audio data without any input to control the output strength of the audio data. That is, since the electronic device does not require any input to control the output strength of the audio data, the user using the electronic device may secure more resources for performing an operation that is performed simultaneously with a call than a user using a general electronic device.

Figure 2B:
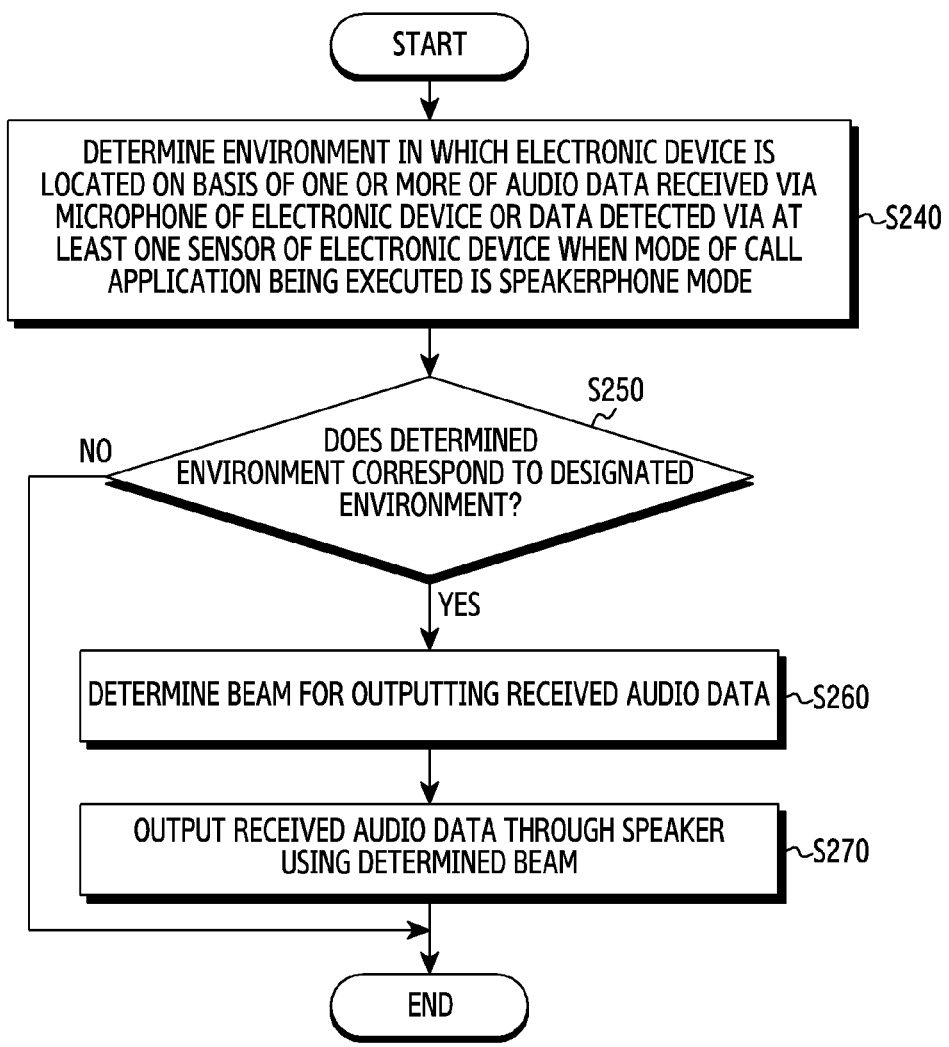
FIG. 2B illustrates an example of the operation of an electronic device outputting audio data received from a different electronic device via a beam according to various embodiments of the disclosure.

FIG. 2B illustrates an example of the operation of an electronic device outputting audio data received from a different electronic device via a beam according to various embodiments of the disclosure.

Referring to FIG. 2B, in operation S240, when the mode of a call application being executed is a speakerphone mode, the electronic device may determine an environment in which the electronic device is located on the basis of one or more of audio data received via a microphone of the electronic device or data detected via at least one sensor of the electronic device. For example, the electronic device may perform an operation corresponding to operation S210 in FIG. 2A.

In operation S250, the electronic device may determine whether the determined environment is a designated environment. The designated environment may be an environment in which audio data output from the electronic device is required to have a high transmission (or output) gain. In addition, the designated environment may be an environment in which the privacy of the user may be infringed. For example, the designated environment may be a baseball park, a concert hall, or a busy street where a crowd gathers. Information about the designated environment may be stored in the electronic device before the release of the electronic device or may be set and stored by user setup after the release of the electronic device.

In operation S260, when the determined environment is the designated environment, the electronic device may determine a beam for outputting the received audio data. The electronic device may enable the audio data output from the electronic device to have directivity using a beam, thereby improving the reception gain of the output audio data. The beam may be configured to decrease the reception gain of audio data via paths other than a path from the electronic device to the user and to increase the reception gain of audio data via the path from the electronic device to the user.

The beam may be a path formed between the user and the electronic device for the audio data output from the electronic device. In some embodiments, the beam may be configured by combining weights, such as a pre-coder or a precoding matrix, and audio data to be output. That is, the electronic device may configure the beam on the basis of digital signal processing. In some other embodiments, the beam may be configured on the basis of one or more of phase shift of audio data to be output or size conversion of audio data to be output. That is, the electronic device may configure the beam on the basis of analog signal processing. In still other embodiments, the electronic device may configure the beam on the basis of digital signal processing and analog signal processing.

In some embodiments, when the determined environment is the designated environment, the electronic device may determine a direction from the electronic device to the user of the electronic device on the basis of the data detected via the at least one sensor of the electronic device. The electronic device may determine a beam corresponding to the determined direction as a beam for outputting the audio data received from the different electronic device.

In operation S270, the electronic device may output the audio data received from the different electronic device through a speaker of the electronic device using the determined beam. The output audio data is transmitted through the beam having directivity and may thus have a high reception gain. In addition, since the output audio data is transmitted through the beam and thus has directivity, the output audio data may have high security.

Although FIG. 2B shows an illustrative operation of the electronic device determining whether to output audio data through a beam according to the environment in which the electronic device is located, this operation is provided only for illustrative purposes. The operation of outputting audio data through a beam may be initiated by a criterion different from that illustrated in FIG. 2B (that is, it is determined whether to transmit a beam depending on the environment). In some embodiments, the electronic device may determine whether the audio data received from the different electronic device is information to be protected from external exposure on the basis of information indicating the different electronic device connected via the call application (for example, the phone number of the electronic device or the identifier (ID) of the electronic device) and may output the audio data through the beam when the audio data is the information to be protected from external exposure. For example, when the received audio data is audio data based on an Automatic Response Service (ARS) of a bank, the electronic device may output the audio data through the beam.

As described above, the electronic device according to various embodiments of the disclosure may determine an environment in which the electronic device is located and may output audio data received from a different electronic device through a beam on the basis of the determined environment, thereby improving the reception gain of the audio data without any input to control the output strength of the audio data. That is, since the electronic device does not require any input to process the audio data, the user using the electronic device may secure more resources for performing an operation that is performed simultaneously with a call than a user using a general electronic device. In addition, the electronic device may prevent the audio data from being exposed to the outside by outputting the audio data through the beam having directivity.

Figure 3:
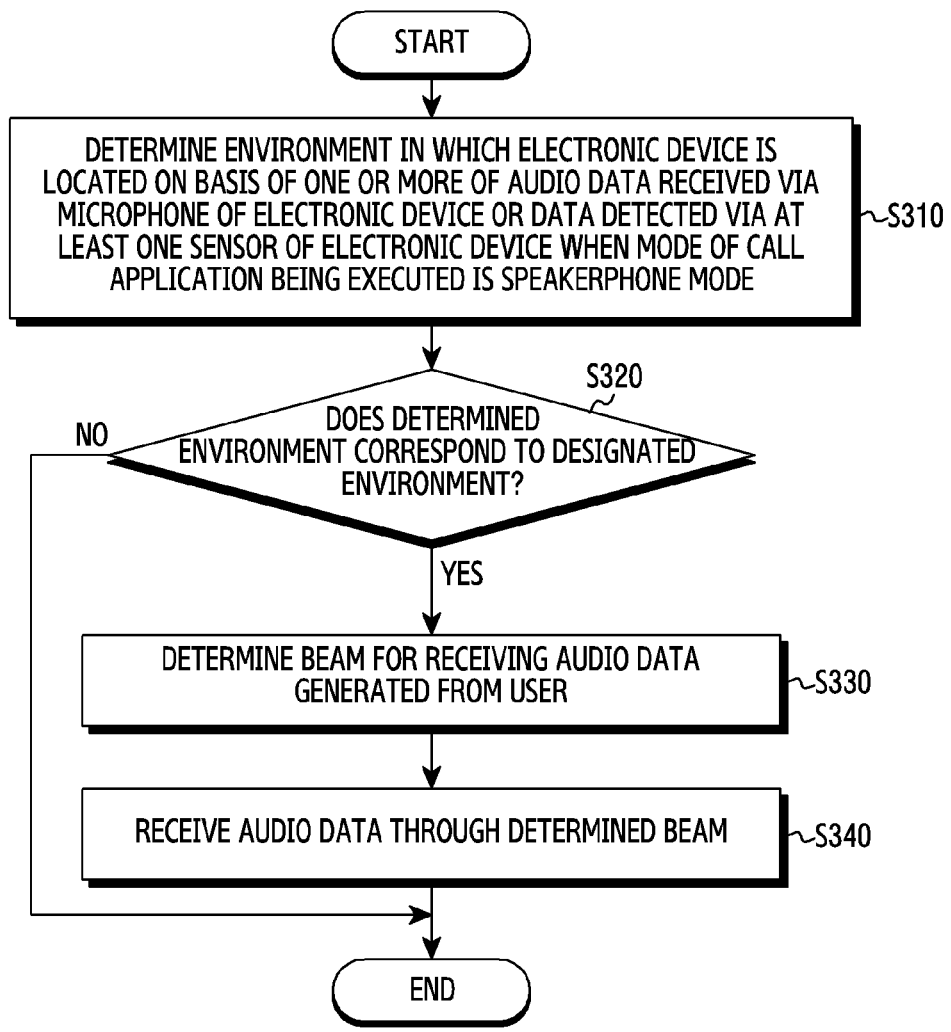
FIG. 3 illustrates an example of the operation of an electronic device receiving audio data of a user via a beam according to various embodiments of the disclosure.

FIG. 3 illustrates an example of the operation of an electronic device receiving audio data of a user via a beam according to various embodiments of the disclosure.

Referring to FIG. 3, in operation S310, when the mode of a call application being executed is a speakerphone mode, the electronic device may determine an environment in which the electronic device is located on the basis of one or more of audio data received via a microphone of the electronic device or data detected via at least one sensor of the electronic device. For example, the electronic device may perform an operation corresponding to operation S210 in FIG. 2A.

In operation S320, the electronic device may determine whether the determined environment is a designated environment. The designated environment may be an environment in which the audio data received by the electronic device is required to have a high reception gain. In addition, the designated environment may be an environment in which the privacy of the user may be infringed. For example, the designated environment may be a baseball park, a concert hall, or a busy street where a crowd gathers. Information about the designated environment may be stored in the electronic device before the release of the electronic device or may be set and stored by user setup after the release of the electronic device.

In operation S330, when the determined environment is the designated environment, the electronic device may determine a beam for receiving the audio data generated from the user. The electronic device may receive the audio data generated from the user using a beam having directivity. The beam may be configured to decrease the reception gain of audio data (for example, noise) received via paths other than a path from the user to the electronic device and to increase the reception gain of audio data received via the path from the user to the electronic device. The beam may be configured on the basis of digital signal processing, on the basis of analog signal processing, or on the basis of digital signal processing and analog signal processing.

In some embodiments, when the determined environment is the designated environment, the electronic device may determine a direction from the user to the electronic device on the basis of the data detected via the at least one sensor of the electronic device. The electronic device may configure the beam in the determined direction.

In operation S340, the electronic device may receive the audio data transmitted from the user through the microphone of the electronic device using the determined beam. The received audio data may have a high reception gain and may include a relatively low level of noise. Therefore, the user of the different electronic device connected via the call application may receive the voice of the user with low noise even though the electronic device is located in an environment having a high level of noise.

As described above, the electronic device according to various embodiments of the disclosure may determine an environment in which the electronic device is located and may receive audio data generated from a user through a beam on the basis of the determined environment, thereby improving the reception gain of the audio data. That is, the electronic device may provide audio data having a relatively low level of noise to a different electronic devices connected via the call application even though the electronic device is located in an environment having a high level of noise.

Figure 4:
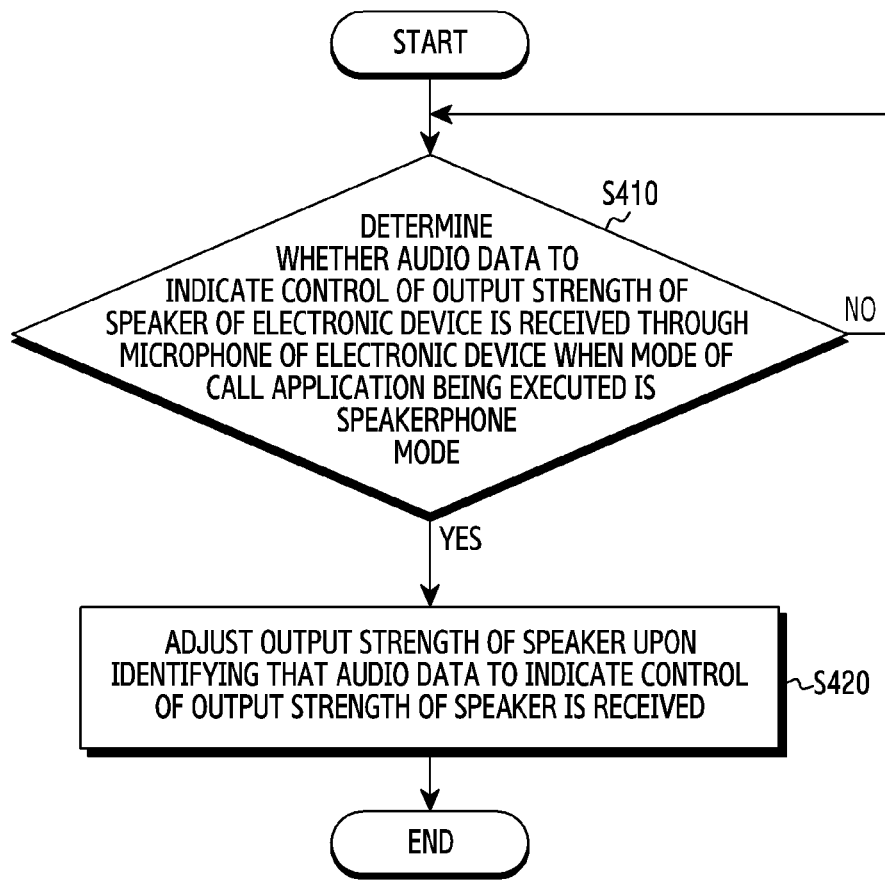
FIG. 4 illustrates an example of the operation of an electronic device controlling the output strength of audio data received from a different electronic device on the basis of the analysis of the audio data according to various embodiments of the disclosure.

FIG. 4 illustrates an example of the operation of an electronic device controlling the output strength of audio data received from a different electronic device on the basis of the analysis of the audio data according to various embodiments of the disclosure.

Referring to FIG. 4, in operation S410, when the mode of a call application being executed is a speakerphone mode, the electronic device may determine whether audio data to indicate the control of the output strength of a speaker of the electronic device is received through a microphone of the electronic device. For example, when the audio data received via the microphone includes an expression "I can't hear you", the electronic device may identify that the audio data received via the microphone includes audio data to indicate the control of the output strength, such as "I can't hear you". In another example, when the audio data received via the microphone includes an expression "yes" or "what", the electronic device may identify that the audio data received via the microphone includes audio data to indicate the control of the output strength, such as "yes?" or "what?" on the basis of the expression "I can't here you" included in the received audio data. In still another example, the electronic device may identify that the audio data received via the microphone includes audio data to indicate the control of the output strength, such as "Ah, my ears hurt".

Upon identifying that the audio data to indicate the control of the output strength of the speaker of the electronic device is received, the electronic device may adjust the output strength of the speaker in operation S420. For example, when the audio data includes an expression "yes?" or "I can't here you", the electronic device may increase the output strength of the speaker. In another example, when the audio data includes an expression "Ah, my ears hurt", the electronic device may reduce the output strength of the speaker.

As described above, the electronic device may monitor the audio data received via the microphone, thereby adjusting the output strength of the speaker without any input to adjust the output strength of the speaker of the electronic device. That is, the electronic device may reduce the number of inputs associated with a call, thereby increasing the convenience of a user using the electronic device.

Figure 5A:
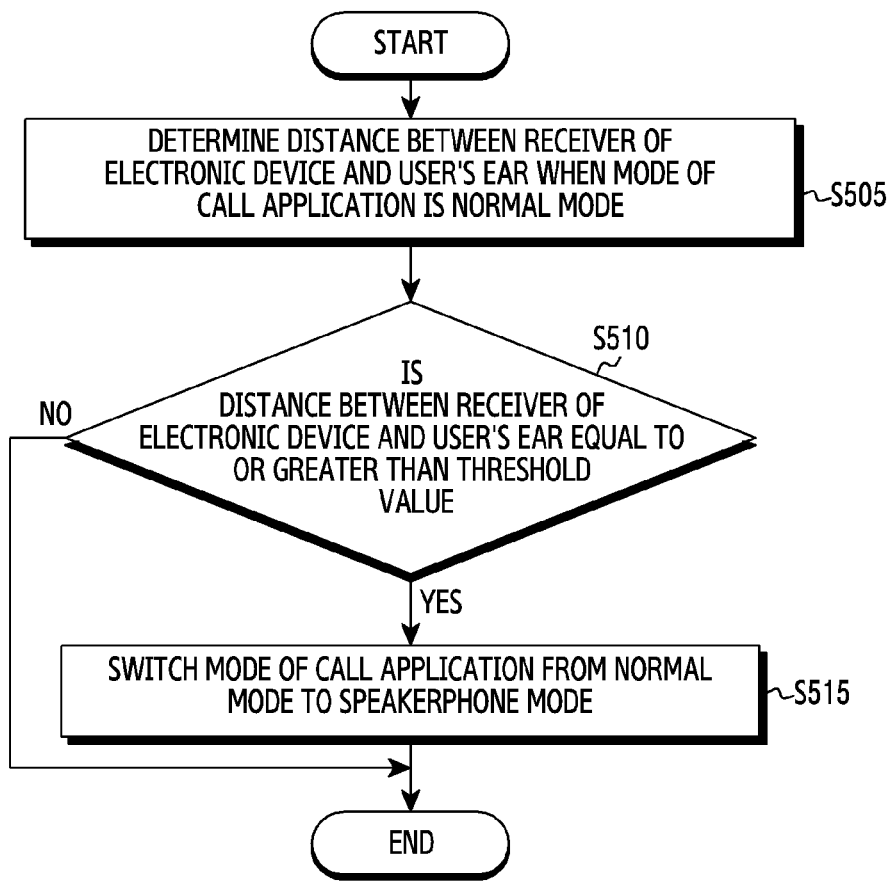
FIG. 5A illustrates an example of the operation of an electronic device switching the mode of a call application according to various embodiments of the disclosure.

FIG. 5A illustrates an example of the operation of an electronic device switching the mode of a call application according to various embodiments of the disclosure.

Referring to FIG. 5A, in operation S505, when the mode of the call application is a normal mode, the electronic device may determine the distance between a receiver of the electronic device and the user's ear. The electronic device may determine the distance between the receiver of the electronic device and the user's ear on the basis of data detected by at least one sensor of the electronic device. For example, the electronic device may determine the distance between the receiver and the user's ear via one or more of a thermal sensor, an image sensor, an infrared sensor, or a proximity sensor located around the receiver of the electronic device.

In operation S510, the electronic device may identify whether the determined distance between the receiver and the user's ear is equal to or greater than a threshold value. The threshold value may be a parameter used to determine whether to switch the mode of the call application from the normal mode to the speakerphone mode. In some embodiments, the threshold value may be adjusted by user input. In some other embodiments, the threshold value may be adaptively changed on the basis of the data detected by the at least one sensor of the electronic device or audio data received via a microphone of the electronic device.

In operation S515, the electronic device may switch the mode of the call application from the normal mode to the speakerphone mode upon identifying that the distance between the receiver of the electronic device and the user's ear is equal to or greater than the threshold value. For example, the electronic device may switch the mode of the call application from the normal mode to the speakerphone mode without any input on an object to activate the speakerphone mode included in a User Interface (UI) for the call application displayed on the electronic device. The user of the electronic device can easily perform a different operation that is performed simultaneously with a call on the basis of the automatic switch.

As described above, the electronic device according to various embodiments of the disclosure may automatically switch the mode of the call application from the normal mode to the speakerphone mode considering the relationship between the electronic device and the user of the electronic device. Since this switch does not independently require the user's input to switch the mode of the call application, the user of the electronic device can easily perform the different operation performed in parallel with the call. For example, when the distance between the user's ear and the electronic device is equal to or greater than the threshold value, the electronic device according to various embodiments of the disclosure automatically switches the mode of the call application to the speakerphone mode, and thus the user using the electronic device may execute a different application (a map application, a messaging application, or a web browser) stored in the electronic device without performing any other operation for switching the mode of the call application during a call with another user.

Figure 5B:
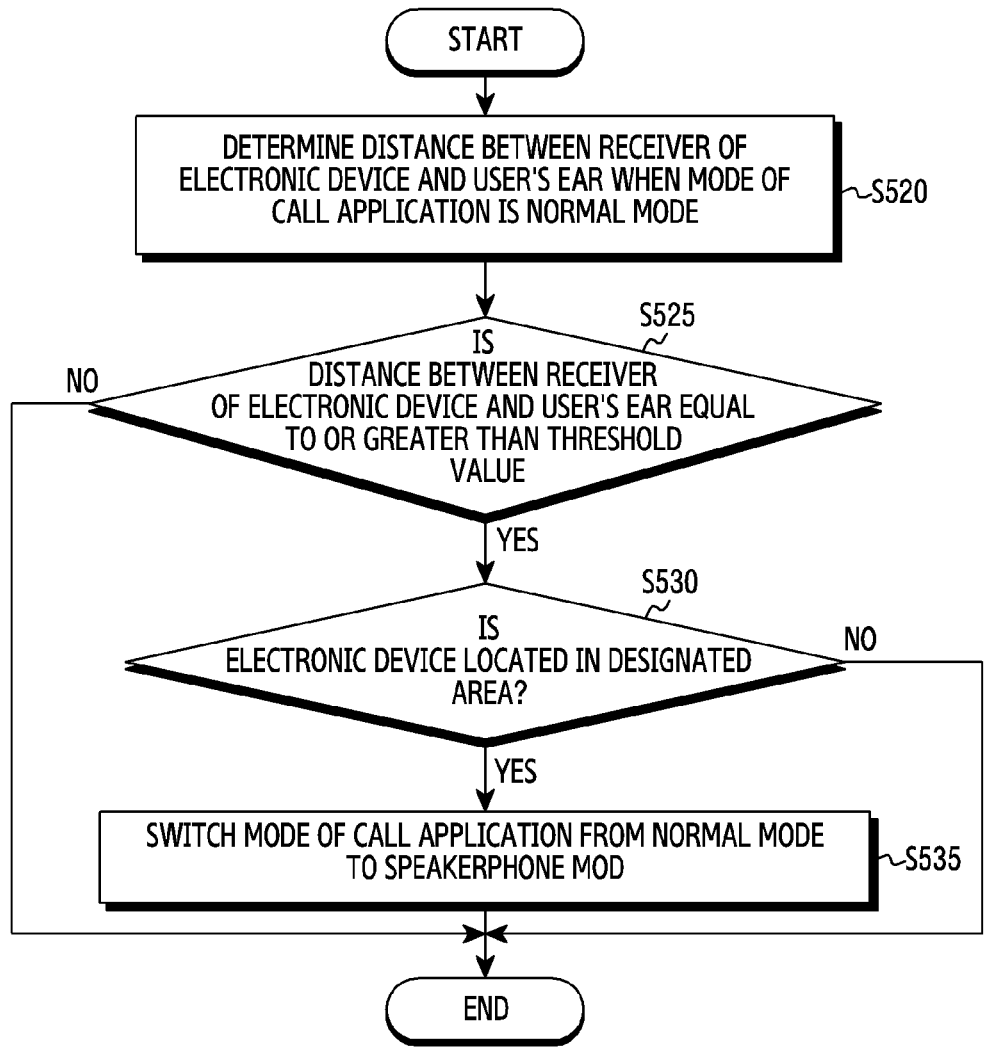
FIG. 5B illustrates another example of the operation of an electronic device switching the mode of a call application according to various embodiments of the disclosure.

FIG. 5B illustrates another example of the operation of an electronic device switching the mode of a call application according to various embodiments of the disclosure.

Referring to FIG. 5B, in operation S520, when the mode of the call application is the normal mode, the electronic device may determine the distance between a receiver of the electronic device and the user's ear. Operation S520 may correspond to operation S505 of FIG. 5A.

In operation S525, the electronic device may identify whether the distance between the receiver and the user's ear is equal to or greater than a threshold value. Operation S525 may correspond to operation S510 of FIG. 5A.

Upon identifying that the distance between the receiver and the user's ear is equal to or greater than the threshold value, the electronic device may identify whether the electronic device is located in a designated area in operation S530. The designated area may be a region where the privacy of the user is less likely to be infringed even though the user makes a call in the speakerphone mode. In some embodiments, the designated area may be defined by user setup. In some other embodiments, the designated area may be determined on the basis of a Universal Subscriber Identity Module (USIM) of the electronic device or subscriber information stored in the electronic device. For example, the designated area may be a home address of the user of the electronic device (for example, an address registered to subscribe to a wireless communication service).

To determine whether the electronic device is located in the designated area, the electronic device may determine the current location of the electronic device by various methods.

In some embodiments, the electronic device may determine the current location of the electronic device on the basis of data detected by a GPS of the electronic device.

In some other embodiments, the electronic device may determine the current location of the electronic device on the basis of at least one relay node to which the electronic device is connected. The relay node may be the same as or different from a relay node to which the electronic device is connected for a call. For example, it is assumed that the electronic device is connected to a relay node for a cellular communication network for a call with a different electronic device and is connected to a relay node for a Wi-Fi network for data communication or the like. The electronic device may determine the current location of the electronic device on the basis of information about the relay node for the cellular communication network and may also determine the current location of the electronic device on the basis of information about the relay node for the Wi-Fi network.

In still other embodiments, the electronic device may determine the current location of the electronic device on the basis of audio data received via a microphone of the electronic device. For example, when the audio data received via the microphone includes information indicating that the user of the electronic device is at home, the electronic device may determine that the current location of the electronic device is the user's home. In another example, when the audio data received via the microphone includes information indicating that the user of the electronic device attends a seminar, the electronic device may determine that the current location of the electronic device is a conference room as a public place.

In still other embodiments, the electronic device may determine the current location of the electronic device on the basis of audio data received from a different electronic device via the call application. For example, when the audio data received from the different electronic device includes information indicating that the user of the electronic device is at home, the electronic device may determine that the current location of the electronic device is the user's home.

In operation S535, the electronic device may switch the mode of the call application from the normal mode to the speakerphone mode upon identifying that the electronic device is located in the designated area. Operation S535 may correspond to operation S515.

As described above, the electronic device according to various embodiments of the disclosure may determine whether to switch the mode of the call application from the normal mode to the speakerphone mode in consideration of not only the distance between the electronic device and the user's ear but also the area where the electronic device is located. That is, when the electronic device is located in a place area where the privacy of the user is highly likely to be infringed, the electronic device may not switch the call mode of the call application, thereby protecting the privacy of the user of the electronic device. Further, when the electronic device is located in a place area where the privacy of the user is less likely to be infringed, the electronic device may switch the call mode of the call application so that the user can conveniently make a call.

Figure 5C:
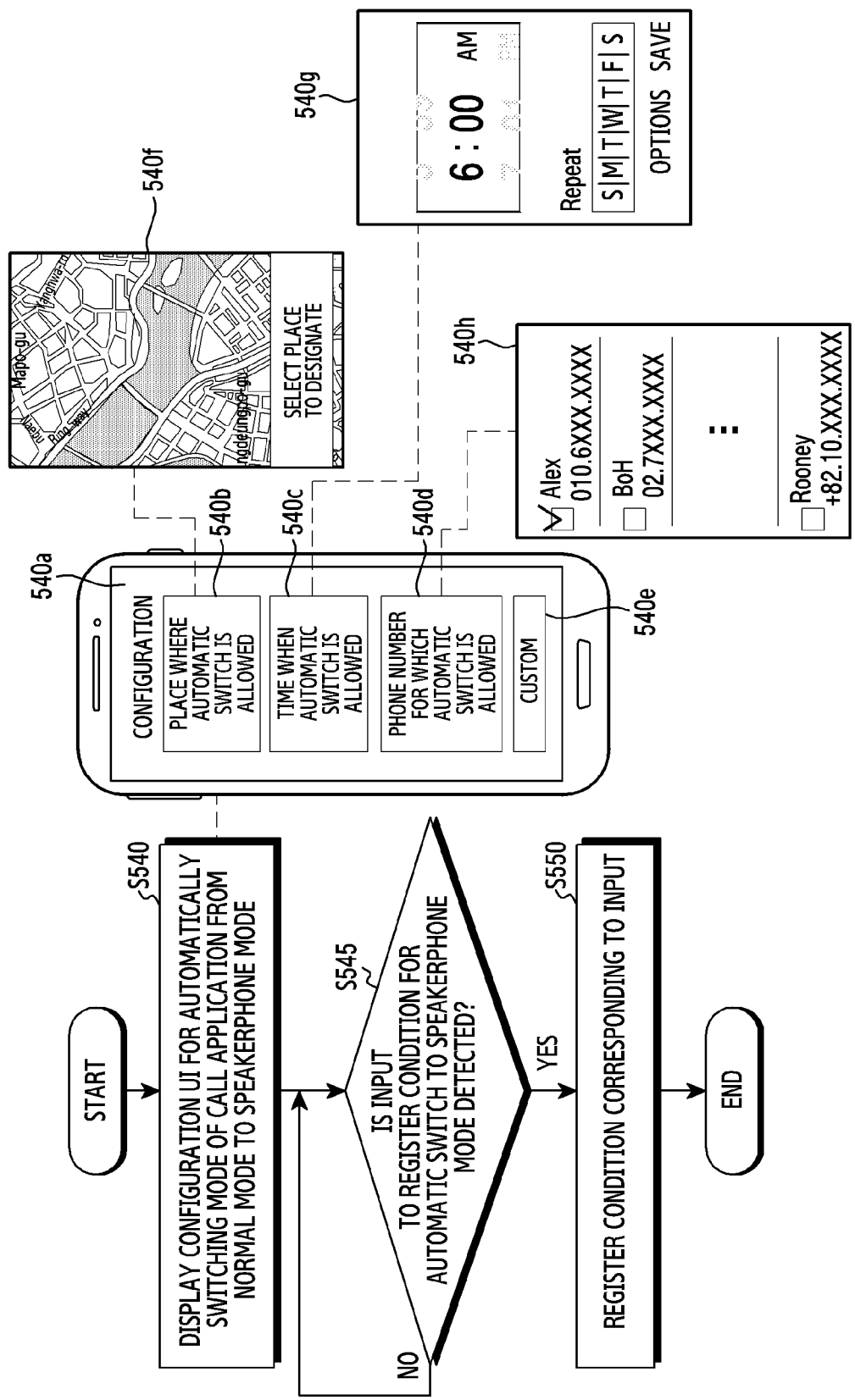
FIG. 5C illustrates an example of the operation of an electronic device registering a configuration for automatically switching a call application according to various embodiments of the disclosure.

FIG. 5C illustrates an example of the operation of an electronic device registering a configuration for automatically switching a call application according to various embodiments of the disclosure.

Referring to FIG. 5C, in operation S540, the electronic device may display a configuration UI for automatically switching the mode of the call application from the normal mode to the speakerphone mode. In some embodiments, the configuration UI may be displayed at the opening of the electronic device. In some other embodiments, the configuration UI may be displayed on the basis of the initiation of an application (for example, a configuration application) that is independent of the call application. In some other embodiments, the configuration UI may be displayed when the electronic device is booted up. In some other embodiments, the configuration UI may be displayed when a certain condition is satisfied, for example, with the advent of a designated period.

For example, the electronic device may display a UI, for example, a UI 540a. The UI 540a may include an object 540b for registering a place in which an automatic switch of the mode of the call application from the normal mode to the speakerphone mode is allowed, an object 540c for registering a time at which the automatic switch is allowed, an object 540d for registering a phone number for which the automatic switch is allowed, and/or an object 540e for registering a condition in which the automatic switch is allowed according to user setup.

In operation S545, the electronic device may identify whether input to register a condition for the automatic switch to the speakerphone mode is detected. Further, when the input is detected, the electronic device may register or store a condition corresponding to the detected input in operation S550.

For example, when input relating to the object 540b included in the UI 540a is detected, the electronic device may display a map, such as a UI 540f. When user input relating to a particular area on the UI 540f is detected, the electronic device may register the particular area as a place in which the automatic switch is allowed. In another example, when input relating to the object 540c included in the UI 540a is detected, the electronic device may display a UI for setting a time, such as a UI 540g. The electronic device may register information (for example, time information or period information (for example, Monday, Tuesday, Wednesday, Thursday, Friday, Saturday, or Sunday)) input via the UI 540g as a time at which the automatic switch is allowed on the basis thereof. In still another example, when input relating to the object 540d included in the UI 540a is detected, the electronic device may display a UI for displaying a phone number registered in the electronic device, such as a UI 540h. The electronic device may register a phone number corresponding to at least one input to a check list of the UI 540h as a phone number for which the automatic switch is allowed.

As described above, the electronic device according to various embodiments of the disclosure may register at least one condition for automatically switching the mode of the call application from the normal mode to the speakerphone mode, thereby reducing the possibility of infringement on the privacy of the user. Further, the electronic device may enable a call with another user to be conveniently performed through the automatic switch. In addition, the electronic device may reduce the number of inputs required to control the call application due to the automatic switch, thereby assisting the user of the electronic device in performing different operations simultaneously with the call.

Figure 6:
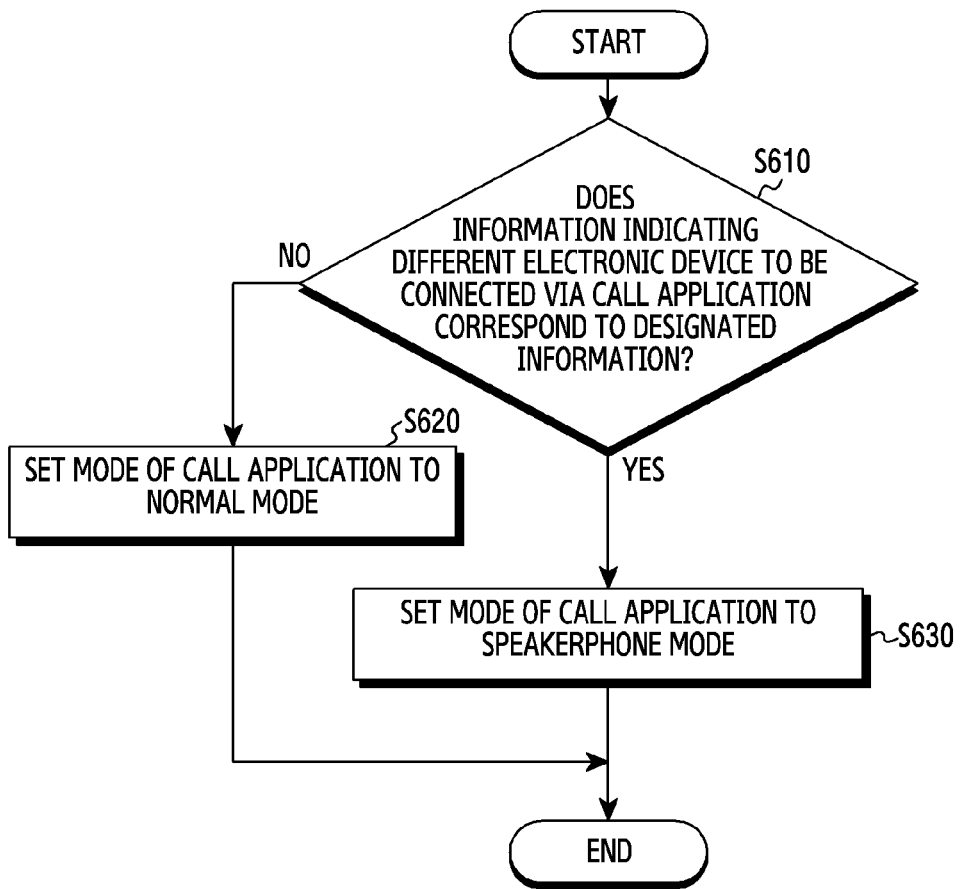
FIG. 6 illustrates an example of the operation of an electronic device determining the mode of a call application on the basis of information indicating a different electronic device according to various embodiments of the disclosure.

FIG. 6 illustrates an example of the operation of an electronic device determining the mode of a call application on the basis of information indicating a different electronic device according to various embodiments of the disclosure.

Referring to FIG. 6, in operation S610, when transmitting a signal for requesting a connection with a different electronic device via the call application, the electronic device may identify or determine whether information indicating the different electronic device to be connected via the call application (for example, a phone number of the different electronic device or an identifier for identifying the different electronic device or a user of the different electronic device) is designated information. The designated information may be information for determining whether to set the mode of the call application to the normal mode or to the speakerphone mode. In some embodiments, the designated information may be registered by a user's direct setup. In some other embodiments, the designated information may be determined on the basis of the call application usage pattern of the user. For example, when the user has made a call at phone number A a reference number of times or more or with a reference frequency in the speakerphone mode, the electronic device may register phone number A as the designated information on the basis of the pattern of the user.

When the information indicating the different electronic device is the designated information, the electronic device may perform operation S630. However, when the information indicating the different electronic device is not the designated information, the electronic device may perform operation S620.

In operation S620, the electronic device may set the mode of the call application to the normal mode upon identifying that the information indicating the different electronic device to be connected via the call application is not the designated information. That is, the electronic device may set the mode of the call application to the normal mode, in which details of a call are less likely to be disclosed, in order to prevent infringement on the privacy of the user of the electronic device. For example, when the phone number of the different electronic device to be connected via the call application is an ARS number of a bank, the electronic device may set the mode of the call application to the normal mode in order to protect personal information of the user of the electronic device.

In operation S630, the electronic device may set the mode of the call application to the speakerphone mode upon identifying that the information indicating the different electronic device to be connected via the call application is the designated information. That is, the electronic device may set the mode of the call application to the speakerphone mode so that the user can perform a different operation while making a call. For example, when the phone number of the different electronic device to be connected via the call application is a phone number of a friend of the user of the electronic device, the electronic device may set the mode of the call application to the speakerphone mode so that the user can conveniently make a call.

As described above, the electronic device according to various embodiments of the disclosure may adaptively set the mode of the call application on the basis of information for identifying a counterpart making a call, thereby improving the convenience of the user and preventing infringement on the privacy of the user.

Figure 7:
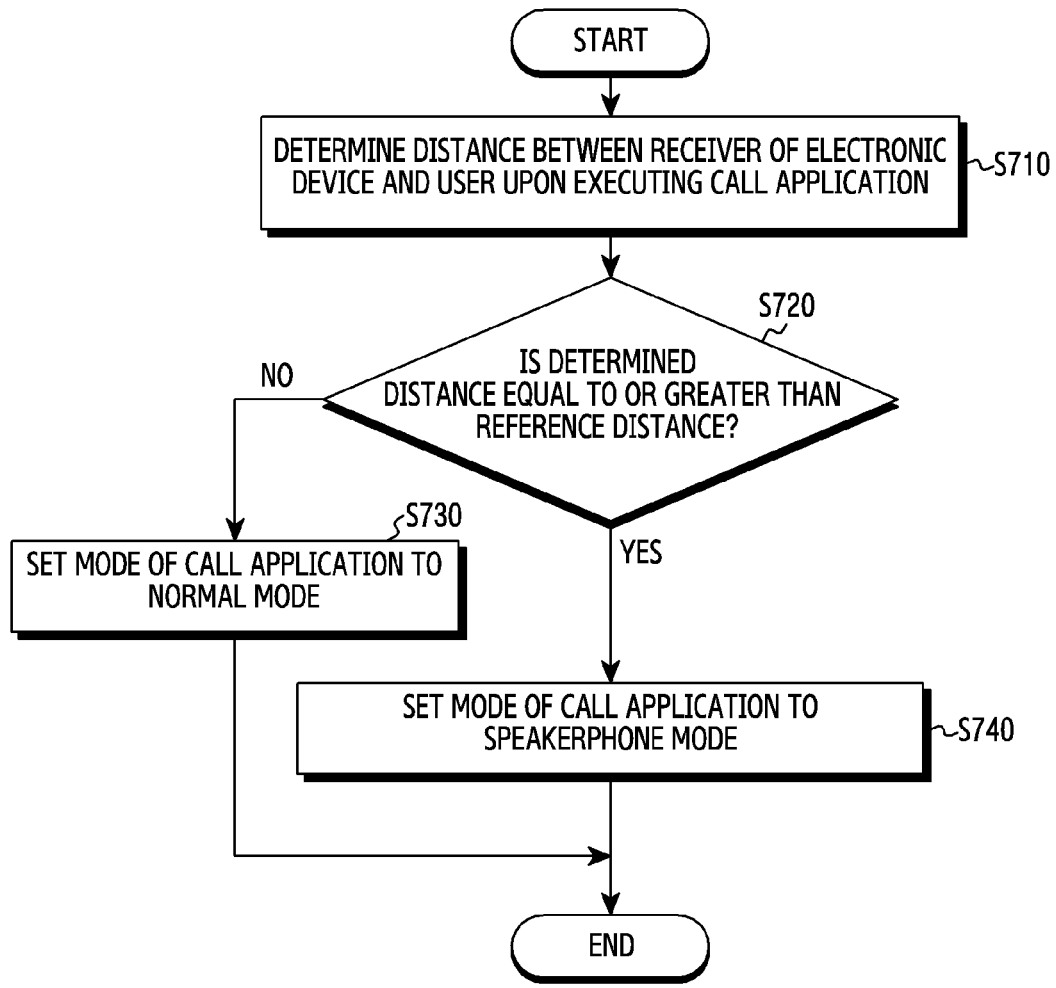
FIG. 7 illustrates an example of the operation of an electronic device setting the mode of a call application according to various embodiments of the disclosure.

FIG. 7 illustrates an example of the operation of an electronic device setting the mode of a call application according to various embodiments of the disclosure.

Referring to FIG. 7, in operation S710, the electronic device may determine the distance between a receiver of the electronic device and a user of the electronic device upon executing the call application. For example, the electronic device may initiate the execution of the call application upon detecting input relating to an object for executing a call application displayed on a display of the electronic device. The electronic device may activate at least one sensor of the electronic device upon initiating the execution of the call application. The electronic device may determine the distance between the receiver of the electronic device and the user of the electronic device on the basis of data detected by the at least one activated sensor.

In operation S720, the electronic device may determine or identify whether the determined distance is equal to or greater than a reference distance. The reference distance may be a parameter for determining the mode of the call application. The reference distance may have a fixed value or may have a value that adaptively changes. When the determined distance is equal to or greater than the reference distance, the electronic device may perform operation S740. However, when the determined distance is less than the reference distance, the electronic device may perform operation S730.

In operation S730, when the determined distance is less than the reference distance, the electronic device may set the mode of the call application to the normal mode. The determined distance being less than the reference distance may indicate that the distance between the electronic device and the user is relatively short. Therefore, the electronic device may set the mode of the call application to the normal mode.

In operation S740, when the determined distance is equal to or greater than the reference distance, the electronic device may set the mode of the call application to the speakerphone mode. The determined distance being equal to or greater than the reference distance may indicate that audio data is required to be output with a higher output level so that the user of the electronic device can recognize the audio data. Therefore, the electronic device may set the mode of the call application to the speakerphone mode.

As described above, the electronic device according to various embodiments of the disclosure may adaptively set the mode of the call application without any input on the basis of the distance between the user and the electronic device. With this configuration, the electronic device may provide the user with a call service corresponding to an action of the user.

Figure 8:
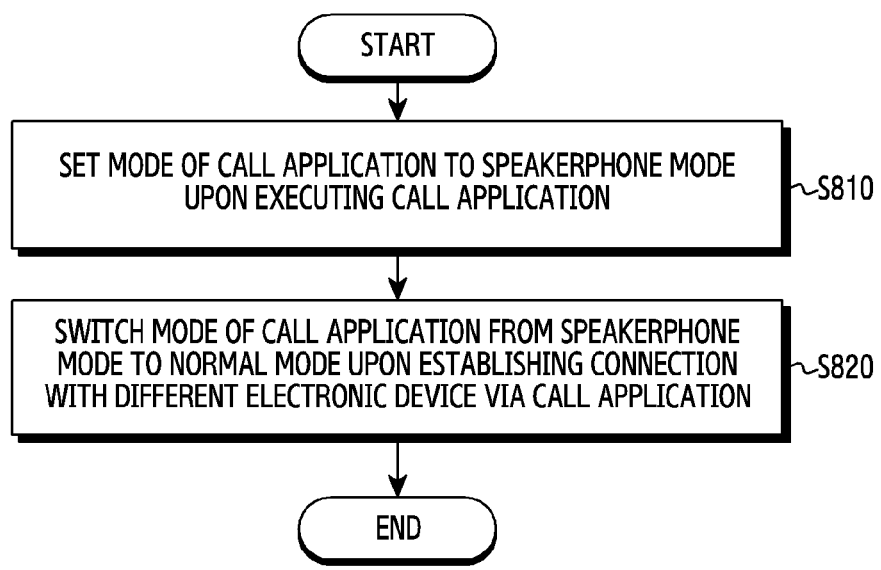
FIG. 8 illustrates an example of the operation of an electronic device switching the mode of a call application according to various embodiments of the disclosure.

FIG. 8 illustrates an example of the operation of an electronic device switching the mode of a call application according to various embodiments of the disclosure.

Referring to FIG. 8, in operation S810, the electronic device may set the mode of the call application to the speakerphone mode upon executing the call application. In general, a connection standby time from the time at which the electronic device transmits a signal for requesting a connection with a different electronic device via a call application to the time at which the electronic device receives a signal indicating that the request is allowed from the different electronic device may be a time in which security is not required (that is, a time in which it does not matter if a sound is externally output). For example, the electronic device may output a ringback tone (a repeated sound or music) irrelevant to security during the connection standby time. The electronic device may set the mode of the call application to the speakerphone mode so that the user of the electronic device can hear the ringback tone even though removing the electronic device from the user's ear during the connection standby time. Since the user can hear the ringback tone via the speakerphone mode, the user can easily perform a different operation using the electronic device.

In operation S820, the electronic device may switch the mode of the call application from the speakerphone mode to the normal mode upon establishing the connection with the different electronic device via the call application. When the connection with the different electronic device is established via the call application, audio data received from the different electronic device is output from the electronic device. That is, a state in which the connection is established may indicate a state in which the audio data received from the different electronic device may be externally exposed. Therefore, in order to prevent the audio data received from the different electronic device from being externally exposed, the electronic device may automatically switch the mode of the call application from the speakerphone mode to the normal mode when the connection is established.

As described above, the electronic device according to various embodiments of the disclosure may operate in the speakerphone mode during a call connection standby time, and may switch from the speakerphone mode to the normal mode upon establishing a call connection with a different electronic device. The electronic device may operate in the speakerphone mode during the call connection standby time, thereby enabling the user of the electronic device to perform different operations using the electronic device with freedom. In addition, the electronic device may switch the mode of the call application to the normal mode upon establishing the call connection with the different electronic device, thereby preventing infringement on the privacy of the user of the electronic device.

Figure 9:
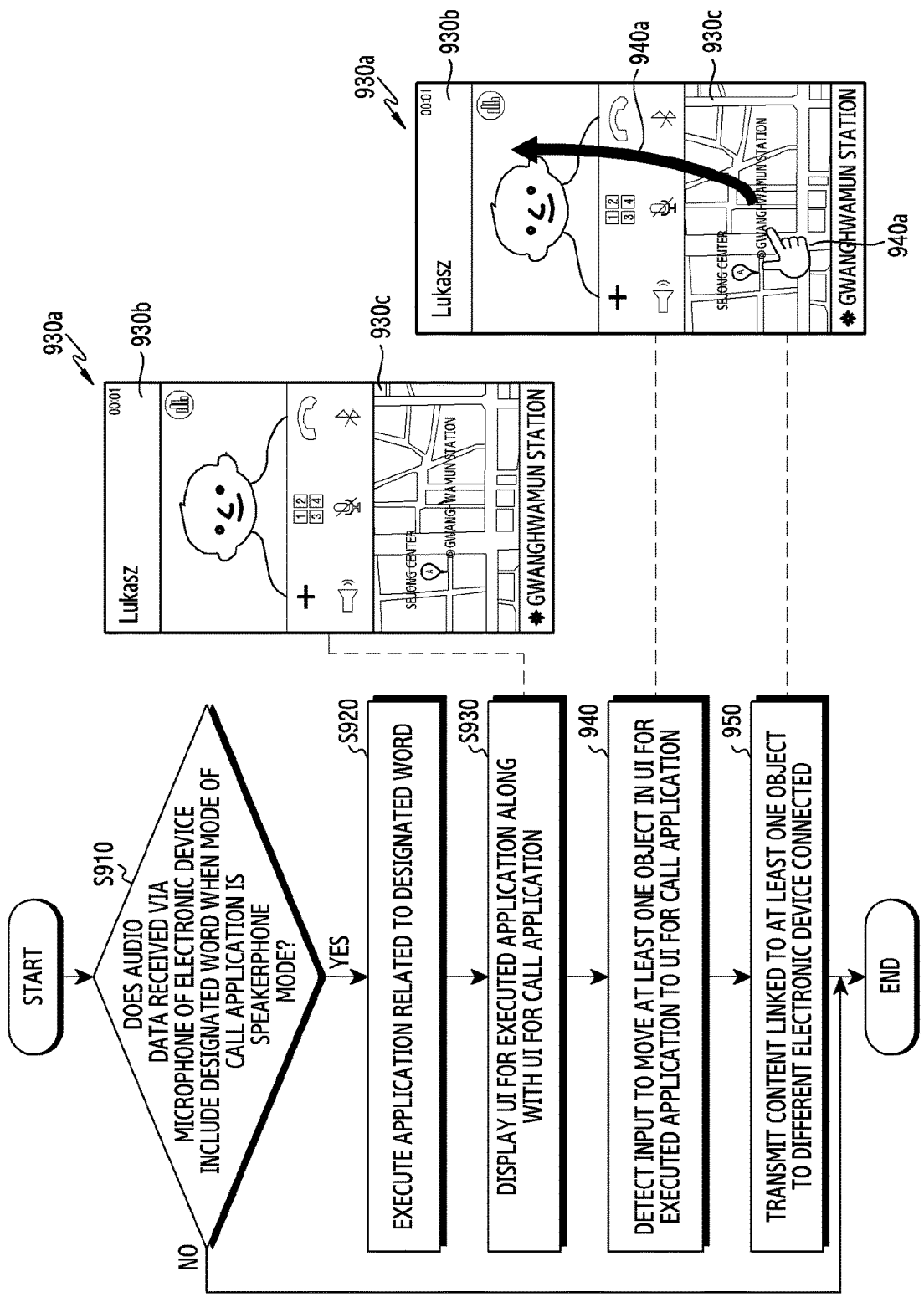
FIG. 9 illustrates an example of the operation of an electronic device displaying a UI for a different application along with a UI for a call application according to various embodiments of the disclosure.

FIG. 9 illustrates an example of the operation of an electronic device displaying a UI for a different application along with a UI for a call application according to various embodiments of the disclosure.

Referring to FIG. 9, in operation S910, when the mode of the call application is the speakerphone mode, the electronic device may identify whether audio data received via a microphone of the electronic device includes a designated word. The designated word may be a reference word for triggering automatic execution of a different application while executing the call application. For example, when a user's voice saying "I will send the location information of Gwanghwamun Station to you" is received via the microphone of the electronic device, the electronic device may recognize that the designate word "location" is included in the user's voice. In another example, when the user's voice saying "I will check the price of a lift ticket to OO Ski Resort now on the Internet" is received via the microphone of the electronic device, the electronic device may recognize that the designated word "Internet" is included in the user's voice. In some embodiments, the designated word may be registered by the user to be stored in the electronic device. In some other embodiments, the designated word may be stored in advance in the electronic device as a default setting of the electronic device. In some embodiments, when identifying that the designated word is included in the audio data received via the microphone, the electronic device may analyze a voice around the designated word. The electronic device may extract or identify a keyword (for example, Gwanghwamun Station or the price of a lift ticket price to OO Ski Resort) from the audio data on the basis of the analysis.

When identifying that the designated word is included in the audio data, the electronic device may execute an application related to the designated word in operation S920. For example, when the audio data includes the designated word "location", the electronic device may execute a map application as an application related to a location. In another example, when the audio data includes the designated word "Internet", the electronic device may execute a web browser as an application related to the Internet. In some embodiments, when executing the application, the electronic device may apply the extracted keyword to the executed application. For example, the electronic device may execute the map application upon recognizing the designated word "location" and may automatically input the extracted keyword "Gwanghwamun Station" into the map application.

In operation S930, the electronic device may display a UI for the executed application along with a UI for the call application. For example, the electronic device may display a view 930a. The view 930a may display a UI 930c for the map application, which is an application executed on the basis of the designated word, along with a UI 930b for the call application. As shown in the UI 930c, the electronic device may provide information corresponding to the keyword (for example, the location of Gwanghwamun Station) on the UI for the application corresponding to the designated word.

FIG. 9 shows an example of displaying the UI 930b and the UI 930c up and down, which is merely for illustrative purposes. The electronic device according to various embodiments of the disclosure may display the UI 930b and the UI 930c in various manners. For example, the electronic device may display the UI 930b and the UI 930c from side to side. In another example, the electronic device may display the UI 930c in a full screen mode and may display a reduced UI for the call application overlapping the UI 930c displayed in the full screen mode. The reduced UI for the call application may display simplified information compared to a normal UI for the call application. For example, the reduced UI may include information indicating a different electronic device and at least one object for activating a representative function executable on the call application.

In operation S940, the electronic device may detect input to move at least one object in the UI for the executed application to the UI for the call application. For example, the input may be input (for example, input 940a) to drag and drop at least one object in the UI for the application into the UI for the call application. In another example, the input may be a combination of first input to touch (or hover over) at least one object in the UI for the application and second input to touch (or hover over) the UI for the call application.

In operation S950, the electronic device may transmit content linked to the at least one object to the different electronic device connected via the call application. A communication technique for transmitting the content may or may not be the same as a communication technique used for a call with the different electronic device. For example, a communication technique used for a call with the different electronic device is a cellular communication method, while a communication technique for transmitting the content may be a Bluetooth method or a Wi-Fi method. In another example, a communication technique used for a call with the different electronic device and a communication technique for transmitting the content may be the same cellular communication method. If necessary, the electronic device may execute still another application to transmit the content to the different electronic device. For example, the electronic device may transmit the content to the different electronic device using a messaging application (Short Message Service (SMS) or Multimedia Messaging Service (MMS) application) stored in the electronic device. In another example, the electronic device may transmit the content to the different electronic device using a messaging application stored in the electronic device. An application for transmitting the content may be designated by the user or may be designated by default.

Figure 10:
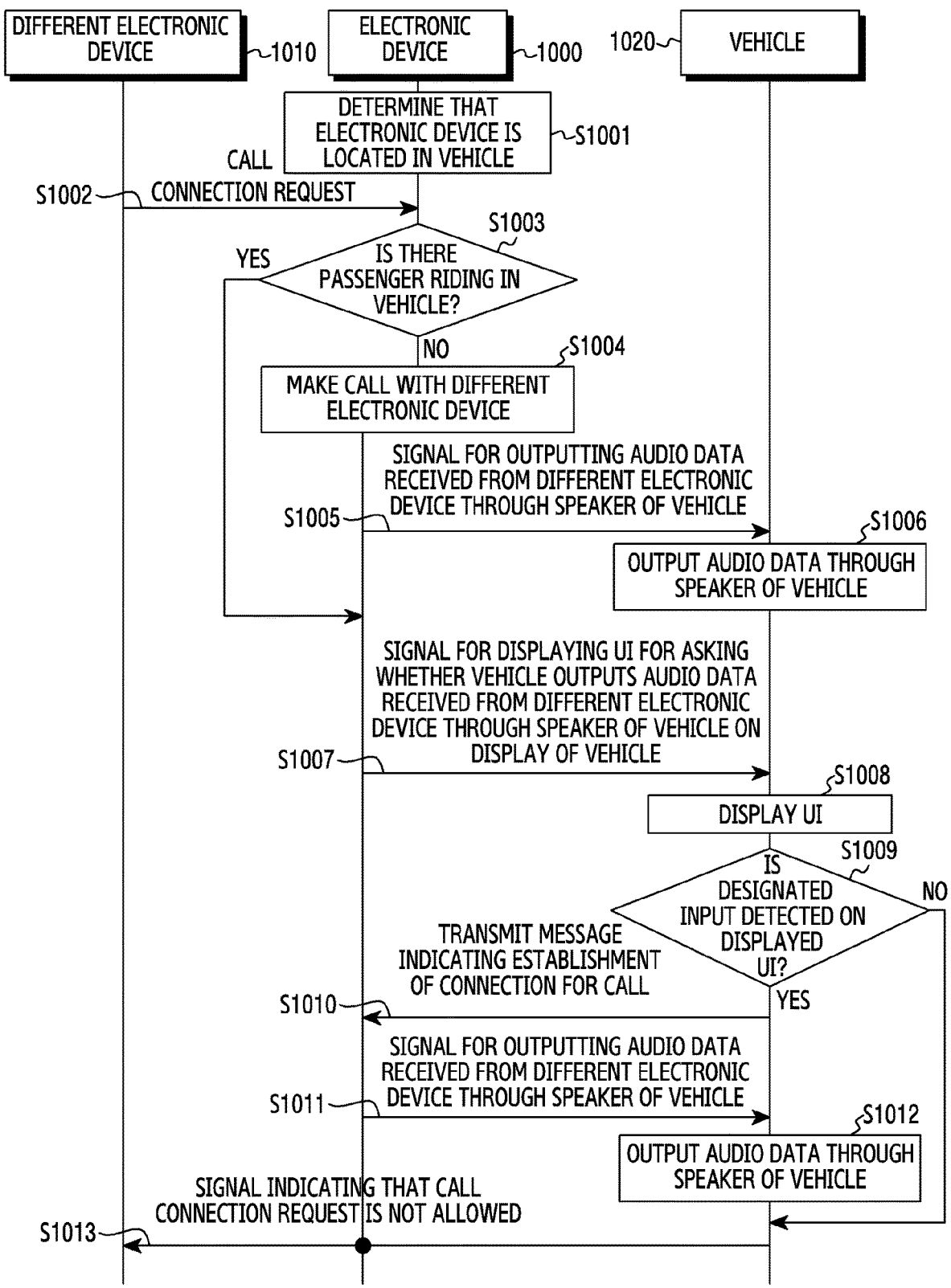
FIG. 10 illustrates an example of signaling between an electronic device determining the mode of a call application in a vehicle and a different electronic device according to various embodiments of the disclosure.

FIG. 10 illustrates an example of signaling between an electronic device determining the mode of a call application in a vehicle and a different electronic device according to various embodiments of the disclosure.

Referring to FIG. 10, in operation S1001, the electronic device 1000 may determine that the electronic device 1000 is located in a vehicle 1020. In some embodiments, when the electronic device 1000 is connected with the vehicle 1020 on the basis of a Bluetooth or Wi-Fi communication method, the electronic device 1000 may determine that the electronic device 1000 is located in the vehicle 1020. In some other embodiments, when detecting via at least one sensor of the electronic device 1000 that the moving speed of the electronic device 1000 is a reference speed or faster, the electronic device 1000 may determine that the electronic device 1000 is located in the vehicle 1020. In some other embodiments, the electronic device 1000 may determine that the electronic device 1000 is located in the vehicle 1020 on the basis of a beacon signal transmitted (or broadcast) from the vehicle 1020.

In operation S1002, a different electronic device 1010 may transmit a call connection request to the electronic device 1000. That is, the different electronic device 1010 may transmit a signal for requesting a call to the electronic device 1000. The electronic device 1000 may receive the call connection request from the different electronic device 1010.

In operation S1003, upon receiving the call connection request, the electronic device 1000 may determine whether there is a passenger riding in the vehicle 1020.

In some embodiments, the vehicle 1020 may detect whether there is a user other than a driver using at least one sensor of the vehicle 1020. The vehicle 1020 may transmit a signal indicating that there is a different user riding in the vehicle 1020 to the electronic device 1000 connected to the vehicle 1020 via a wireless communication path. Upon receiving the signal, the electronic device 1000 may determine that there is a passenger riding in the vehicle 1020.

In some other embodiments, the electronic device 1000 may detect whether there is a different user other than the user of the electronic device 1000 riding in the vehicle 1020 on the basis of the beacon signal transmitted from the vehicle 1020. Specifically, an electronic device of the different user may receive the beacon signal transmitted from the vehicle 1020. Upon receiving the beacon signal, the electronic device of the different user may transmit a signal indicating that the beacon signal has been received to a server associated with the beacon signal. Upon receiving the signal indicating that the beacon signal has been received, the server may transmit a signal indicating that there is the different user other than the user of the electronic device 1000 riding in the vehicle 1020 to the electronic device 1000 registered as an electronic device associated with the vehicle 1020. Upon receiving the signal indicating that there is the different user riding from the server, the electronic device 1000 may recognize that there is the different user riding in the vehicle 1020.

In some other embodiments, the electronic device 1000 may recognize there is a different user riding in the vehicle 1020 on the basis of a signal transmitted from an electronic device of the different user riding in the vehicle 1020 to the electronic device 1000 through a proximity communication path.

In some other embodiments, the electronic device 1000 may recognize there is a different user riding in the vehicle 1020 on the basis of a signal transmitted from an electronic device of the different user riding in the vehicle 1020 to the vehicle 1020 through a proximity communication path. Specifically, the electronic device of the different user may transmit a broadcast signal to the vehicle 1020 via a Bluetooth communication path. Upon receiving the broadcast signal, the vehicle 1020 may transmit a signal indicating that there is a different user riding in the vehicle 1020 to the electronic device 1000. Upon receiving the signal indicating that there is the different user riding, the electronic device 1000 may recognize that there is the different user riding in the vehicle 1020.

When identifying or determining that there is the passenger riding in the vehicle, the electronic device 1000 may perform operation S1007. However, when identifying or determining that there is no passenger riding in the vehicle the electronic device 1000 may perform operation S1004.

In operation S1004, when there is no passenger riding in the vehicle 1020, the electronic device 1000 may make a call with the different electronic device upon receiving input indicating the acceptance of the call connection request received from the different electronic device 1010. In some embodiments, the input may be received directly through the electronic device 1000. In some other embodiments, the input may be received by the electronic device 1000 via a system in the vehicle 1020. For example, when the user of the electronic device 1000 triggers input indicating the acceptance of the call connection request on a display in the vehicle 1020 connected to the electronic device 1000, the vehicle 1020 may transmit a signal indicating the acceptance of the call connection request to the electronic device 1000 connected with the vehicle 1020. The electronic device 1000 may establish a connection for a call with the different electronic device upon receiving the signal indicating the acceptance of the call connection request.

In operation S1005, the electronic device 1000 may transmit, to the vehicle 1020, a signal for outputting audio data received from the different electronic device 1010 through a speaker of the vehicle 1020. The vehicle 1020 may receive the signal for outputting the audio data through the speaker of the vehicle 1020 from the electronic device 1000.

In operation S1006, the vehicle 1020 may output the audio data through the speaker of the vehicle 1020. Although not shown in FIG. 10, the vehicle 1020 may activate a microphone in the vehicle 1020 in order to receive audio data produced from the user of the electronic device 1000.

In operation S1007, when there is the passenger riding in the vehicle 1020, the electronic device 1000 may transmit, to the vehicle 1020, a signal for displaying a UI for asking whether the vehicle 1020 outputs the audio data received from the different electronic device 1010 through the speaker of the vehicle 1020 on the display of the vehicle 1020. The vehicle 1020 may receive the signal for displaying the UI on the display of the vehicle 1020 from the electronic device 1000.

In operation S1008, the vehicle 1020 may display the UI on the display of the vehicle 1020. The UI may include a first object for allowing the output of the audio data received from the different electronic device 1010 through the speaker of the vehicle 1020 and a second object for not allowing the output of the audio data received from the different electronic device 1010 through the speaker of the vehicle 1020.

In operation S1009, the vehicle 1020 may identify whether designated input is detected on the displayed UI. The designated input may be input to the first object. When the vehicle 1020 detects the input to the first object, the vehicle 1020 may perform operation S1010. However, when the vehicle 1020 detects input to the second object or input that is not associated with the first object (for example, when no input to the first object is not detected for a designated time), the vehicle 1020 may perform operation S1013.

In operation S1010, upon detecting the input to the first object, the vehicle 1020 may transmit a message indicating the establishment of the connection for the call to the electronic device 1000. The electronic device 1000 may receive the message indicating the establishment of the connection for the call from the vehicle 1020. The electronic device 1000 may establish a connection for a call with the different electronic device 1010 upon receiving the message.

In operation S1011, the electronic device 1000 may transmit a signal for outputting audio data received from the different electronic device 1010 through the speaker of the vehicle 1020. That is, when the connection for the call with the different electronic device 1010 is established, the electronic device 1000 may transmit the signal for outputting the audio data received from the different electronic device 1010 through the speaker of the vehicle 1020. The vehicle 1020 may receive, from the electronic device 1000, the signal for outputting the audio data received from the different electronic device 1010 through the speaker of the vehicle 1020.

In operation S1012, the electronic device 1000 may output the audio data through the speaker of the vehicle 1020.

When no designated input is detected, the vehicle 1020 may transmit a signal indicating that the call connection request is not allowed to the different electronic device 1010 via the electronic device 1000 in operation S1013. Specifically, the vehicle 1020 may transmit a signal indicating that the call connection request from the different electronic device 1010 is rejected to the electronic device 1000. Upon receiving the signal indicating that the call connection request is rejected, the electronic device 1000 may transmit the signal indicating that the call connection request is rejected to the different electronic device 1010.

As described above, when located in the vehicle, the electronic device according to various embodiments of the disclosure may determine whether to output audio data received from the different electronic device through the speaker of the vehicle connected with the electronic device according to user input. For example, when there is a passenger riding in the vehicle and a private call is necessary, the electronic device may not allow a connection for a call with the different electronic device on the basis of signaling with the vehicle. In another example, when there is a passenger riding in the vehicle and a private call is not required, the electronic device may allow a connection for a call with the different electronic device on the basis of signaling with the vehicle. That is, the electronic device may prevent infringement on the privacy of the user of the electronic device through signaling with the vehicle.

Figure 11:
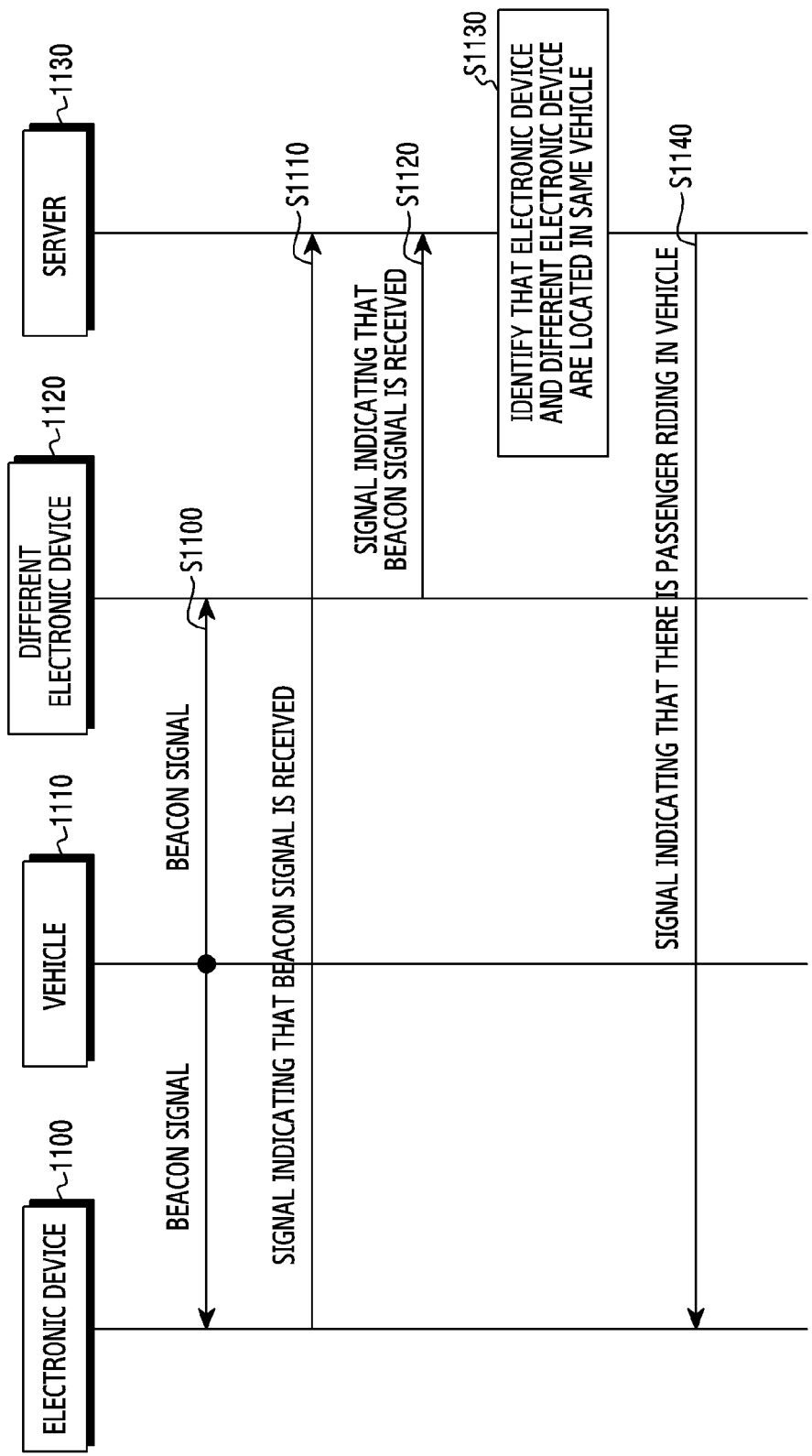
FIG. 11 illustrates an example of signaling between an electronic device and other devices to determine whether there is a passenger riding in a vehicle of a user of an electronic device according to various embodiments of the disclosure.

FIG. 11 illustrates an example of signaling between an electronic device and other devices to determine whether there is a passenger riding in a vehicle of a user of an electronic device according to various embodiments of the disclosure.

Referring to FIG. 11, in operation S1100, the vehicle 1110 may periodically broadcast a beacon signal. The coverage of the beacon signal may be an area in which the electronic device may be located within the vehicle 1110. The beacon signal may be an advertisement message indicating to other devices that there is an electronic system of the vehicle 1110. The beacon signal may include information about the identifier of the vehicle 1110 for identifying the vehicle 1110. The electronic device 1100 owned by the user of the vehicle 1110 and a different electronic device 1120 owned by a passenger of the user may receive the beacon signal.

In operation S1110, upon receiving the beacon signal, the electronic device 1100 may transmit the beacon signal or a signal indicating the reception of the beacon signal to a server 1130 for the vehicle 1110. The signal indicating the reception of the beacon signal may include the information about the identifier of the vehicle 1110, included in the received beacon signal, and information about the identifier of the electronic device 1100 for identifying the electronic device 1100. The server 1130 may receive the signal indicating the reception of the beacon signal from the electronic device 1100.

In operation S1120, upon receiving the beacon signal, the different electronic device 1120 may transmit a signal indicating the reception of the beacon signal to the server 1130. The signal indicating the reception of the beacon signal may include the information about the identifier of the vehicle 1110, included in the received beacon signal, and information about the identifier of the different electronic device 1120 for identifying the different electronic device 1120. The server 1130 may receive the signal indicating the reception of the beacon signal from the different electronic device 1120.

Operations S1110 and S1120 may be performed in any order. That is, unlike in FIG. 11, operation S1110 may be performed after operation S1120 is performed, or operation S1110 and operation S1120 may be performed at the same time.

In operation S1130, the server 1130 may identify that the electronic device 1100 and the different electronic device 1120 are located in the same vehicle on the basis of the identifier of the electronic device 1100, the identifier of the different electronic device 1120, and the identifier of the vehicle 1110.

In operation S1140, the server 1130 may transmit a signal indicating that there is a passenger riding in the vehicle 1110 to the electronic device 1100 registered for the vehicle 1110. In some embodiments, unlike in FIG. 11, the server 1130 may transmit a signal indicating that there is a passenger riding in the vehicle 1110 to the vehicle 1110. In this case, the vehicle 1110 may transmit the signal indicating that there is the passenger riding in the vehicle 1110 to the electronic device 1100 linked (or connected) with the vehicle 1110.

As described above, a method of an electronic device according to various embodiments of the disclosure may include: determining the distance between the electronic device and a user of the electronic device during execution of a call application; determining the output strength of audio data received from a different electronic device connected via the call application as an output strength corresponding to the determined distance, and outputting the audio data with the determined output strength.

In some embodiments, the determining of the distance between the electronic device and the user of the electronic device may include determining the distance between the electronic device and the user of the electronic device when a mode of the executed call application is a speakerphone mode, and the outputting of the audio data may include outputting the audio data with the determined output strength through a speaker of the electronic device. The method of the electronic device may further include: determining the distance between a receiver of the electronic device and an ear of the user when the mode of the executed call application is a normal mode; and switching the mode of the call application from the normal mode to the speakerphone mode when the distance between the receiver and the ear of the user is equal to or greater than a threshold value. The determining of the distance between the receiver and the ear of the user may include determining the distance between the receiver and the ear of the user on the basis of data detected using at least one sensor including one or more of a temperature sensor, a proximity sensor, an image sensor, or a gyro sensor. The switching of the mode of the call application may include: identifying whether the electronic device is located in a designated area when the distance between the receiver and the ear of the user is equal to or greater than the threshold value; and switching the mode of the call application from the normal mode to the speakerphone mode upon identifying that the electronic device is located in the designated area. Further, the switching of the mode of the call application may include: identifying whether the electronic device may be located in the designated area using a Global Positioning System (GPS) of the electronic device; and switching the mode of the call application from the normal mode to the speakerphone mode upon identifying that the electronic device is located in the designated area. The switching of the mode of the call application may include: identifying a relay node connected with the electronic device for data communication when the distance between the receiver and the ear of the user is equal to or greater than the threshold value; and switching the mode of the call application from the normal mode to the speakerphone mode when the identified relay node is a designated node.

In some embodiments, the method of the electronic device may further include: identifying whether the audio data received via a microphone of the electronic device includes a designated word when a mode of the call application is a speakerphone mode; executing an application related to the designated word when the audio data includes the designated word; and displaying a first User Interface (UI) for the executed application along with a second UI for the call application. The method of the electronic device may further include: detecting input to move at least one object in the displayed first UI to the displayed second UI; and transmitting content linked to the at least one object to the different electronic device on the basis of detection.

In some embodiments, the method of the electronic device may further include: revising the audio data received via the microphone of the electronic device on the basis of the determined distance between the electronic device and the user of the electronic device; and transmitting the revised audio data to the different electronic device.

In some embodiments, the method of the electronic device may further include: identifying whether different audio data to control the output strength of the audio data is received via a microphone of the electronic device when a mode of the call application is a speakerphone mode; and adjusting an output strength of a speaker upon identifying that the different audio data to control the output strength is received.

Figure 12:
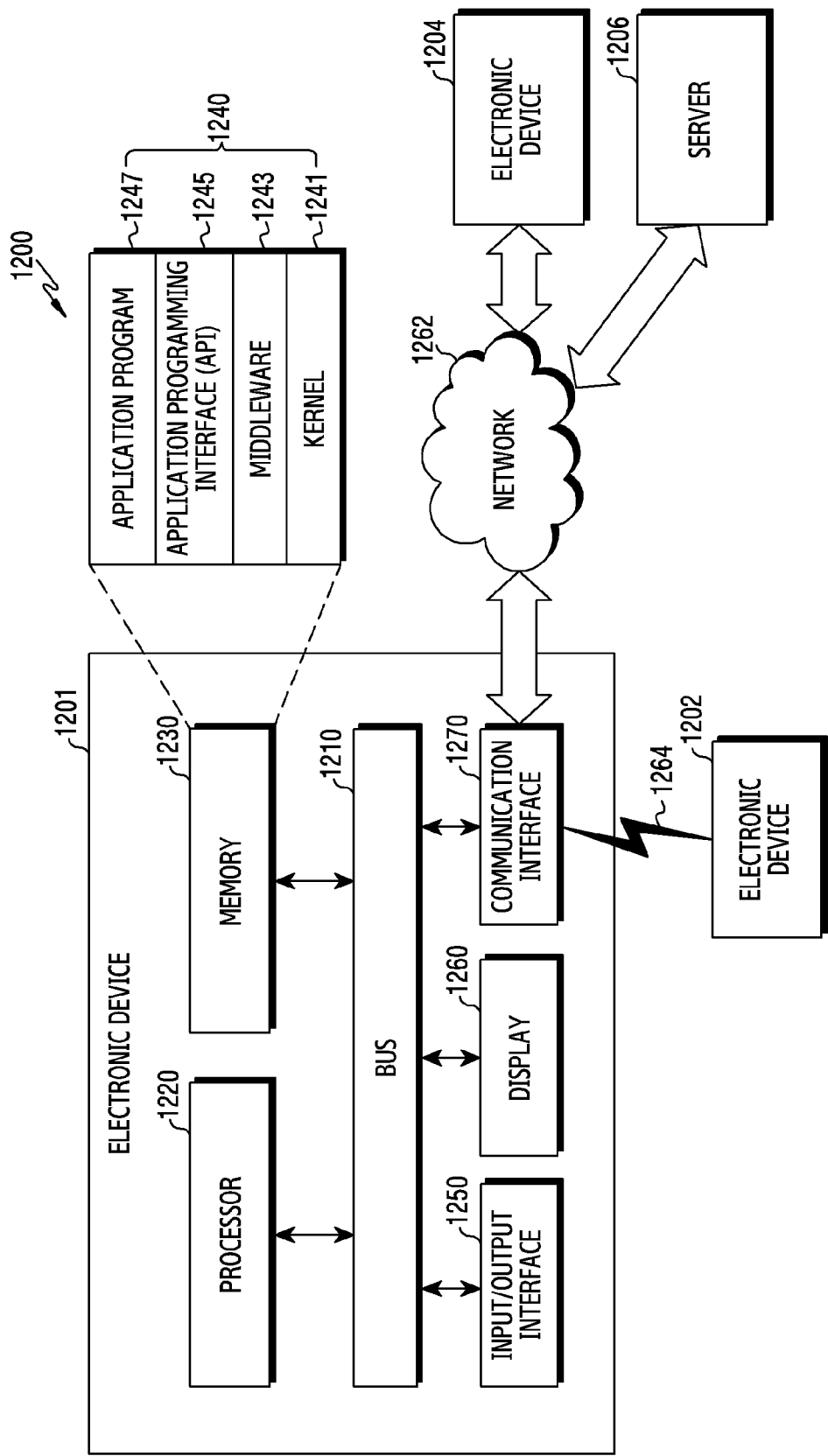
FIG. 12 illustrates an example of a network environment including an electronic device according to various embodiments of the disclosure.

FIG. 12 illustrates an example of a network environment including an electronic device according to various embodiments of the disclosure.

FIG. 12 shows an electronic device 1201 in a network environment 1200 according to various embodiments. The electronic device 1201 may include a bus 1210, a processor 1220, a memory 1230, an input/output interface 1250, a display 1260, and a communication interface 1270. In some embodiments, at least one of the components may be omitted, or other components may be further included in the electronic device 1201.

The bus 1210 may include a circuit that connects the components 1210 to 1270 to each other and delivers communications (for example, control messages or data) between the components.

The processor 1220 may include one or more of a Central Processing Unit (CPU), an Application Processor (AP), and a Communication Processor (CP). The processor 1220 may control, for example, at least one different component of the electronic device 1201, and/or may perform operations relating to communication or data processing.

The memory 1230 may include volatile and/or nonvolatile memory. The memory 1230 may store, for example, a command or data related to at least one different component of the electronic device 1201. According to one embodiment, the memory 1230 may store software and/or a program 1240. The program 1240 may include, for example, a kernel 1241, middleware 1243, an Application Programming Interface (API) 1245, and/or an application (or "app") 1247. At least part of the kernel 1241, the middleware 1243, and the API 1245 may be designated as an Operating System (OS). The kernel 1241 may control or manage system resources (for example, the bus 1210, the processor 1220, the memory 1230, or the like) used to perform an operation or function implemented, for example, in other programs (for example, the middleware 1243, the API 1245, or the application 1247). Further, the kernel 1241 may provide an interface that allows the middleware 1243, the API 1245, or the application 1247 to access individual components of the electronic device 1201 to thereby control or manage system resources.

The middleware 1243 may serve as a relay so that, for example, the API 1245 or the application 1247 communicates with the kernel 1241 to exchange data. Further, the middleware 1243 may process one or more requests for operations received from the application 1247 according to the priority thereof. For example, the middleware 1243 may assign at least one application 1247 a priority for using a system resource of the electronic device 1201 (for example, the bus 1210, the processor 1220, the memory 1230, or the like) and may process the one or more requests for operations. The API 1245 is an interface for the application 1247 to control a function provided from the kernel 1241 or the middleware 1243, and may include, for example, at least one interface or function (for example, a command) for file control, window control, image processing, or text control. The input/output interface 1250 may deliver a command or data, which is input from, for example, a user or a different external device, to a different component(s) of the electronic device 1201, or may output a command or data, which is received from a different component(s) of the electronic device 1201, to the user or to the different external device.

The display 1260 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 1260 may display, for example, various types of content (for example, text, an image, a video, an icon, and/or a symbol) for the user. The display 1260 may include a touch screen and may receive touch, gesture, proximity, or hovering input using, for example, an electronic pen or a body part of a user. The communication interface 1270 may establish communication, for example, between the electronic device 1201 and an external device (for example, a first external electronic device 1202, a second external electronic device 1204, or a server 1206). For example, the communication interface 1270 may be connected to a network 1262 via wireless communication or wired communication to communicate with the external device (for example, the second external electronic device 1204 or the server 1206).

The wireless communication may include cellular communication using, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to one embodiment, the wireless communication may include, for example, at least one of Wireless Fidelity (Wi-Fi), Bluetooth, Bluetooth Low Energy (BLE), ZigBee, Near-Field Communication (NFC), Magnetic Secure Transmission (MST), Radio Frequency (RF), or a Body Area Network (BAN). According to one embodiment, the wireless communication may include a Global Navigation Satellite System (GNSS). The GNSS may be, for example, a Global Positioning System (GPS), a Global Navigation Satellite System (GNSS), a BeiDou Navigation Satellite System (hereinafter, "BeiDou"), or Galileo, which is the European global satellite-based navigation system. In this document, "GPS" may be interchangeably used with "GNSS". The wired communication may include, for example, at least one of Universal Serial Bus (USB), High-Definition Multimedia Interface (HDMI), Recommended Standard 232 (RS-232), Power Line Communication, and Plain Old Telephone Service (POTS). The network 1262 may include a telecommunications network, which may be, for example, at least one of a computer network (for example, a Local Area Network (LAN) or Wide Area Network (WAN)), the Internet, and a telephone network.

Each of the first and second external electronic devices 1202 and 1204 may be a device of a type that is the same as, or different from, that of the electronic device 1201. According to various embodiments, all or some of the operations performed in the electronic device 1201 may be performed in another electronic device or a plurality of electronic devices (for example, the electronic devices 1202 and 1204 or the server 1206). According to one embodiment, when the electronic device 1201 needs to perform a function or service automatically or upon request, the electronic device 1201 may request another electronic device (for example, the electronic device 1202 or 1204, or the server 1206) to perform at least some functions related to the function or service, instead of, or in addition to, autonomously performing the function or service. The other electronic device (for example, the electronic device 1202 or 1204, or the server 1206) may perform the requested functions or additional functions and may transmit the result thereof to the electronic device 1201. The electronic device 1201 may provide the requested function or service using the result as it was received or after additionally processing the result. To this end, for example, cloud-computing, distributed-computing, or client-server-computing technologies may be used.

Figure 13:
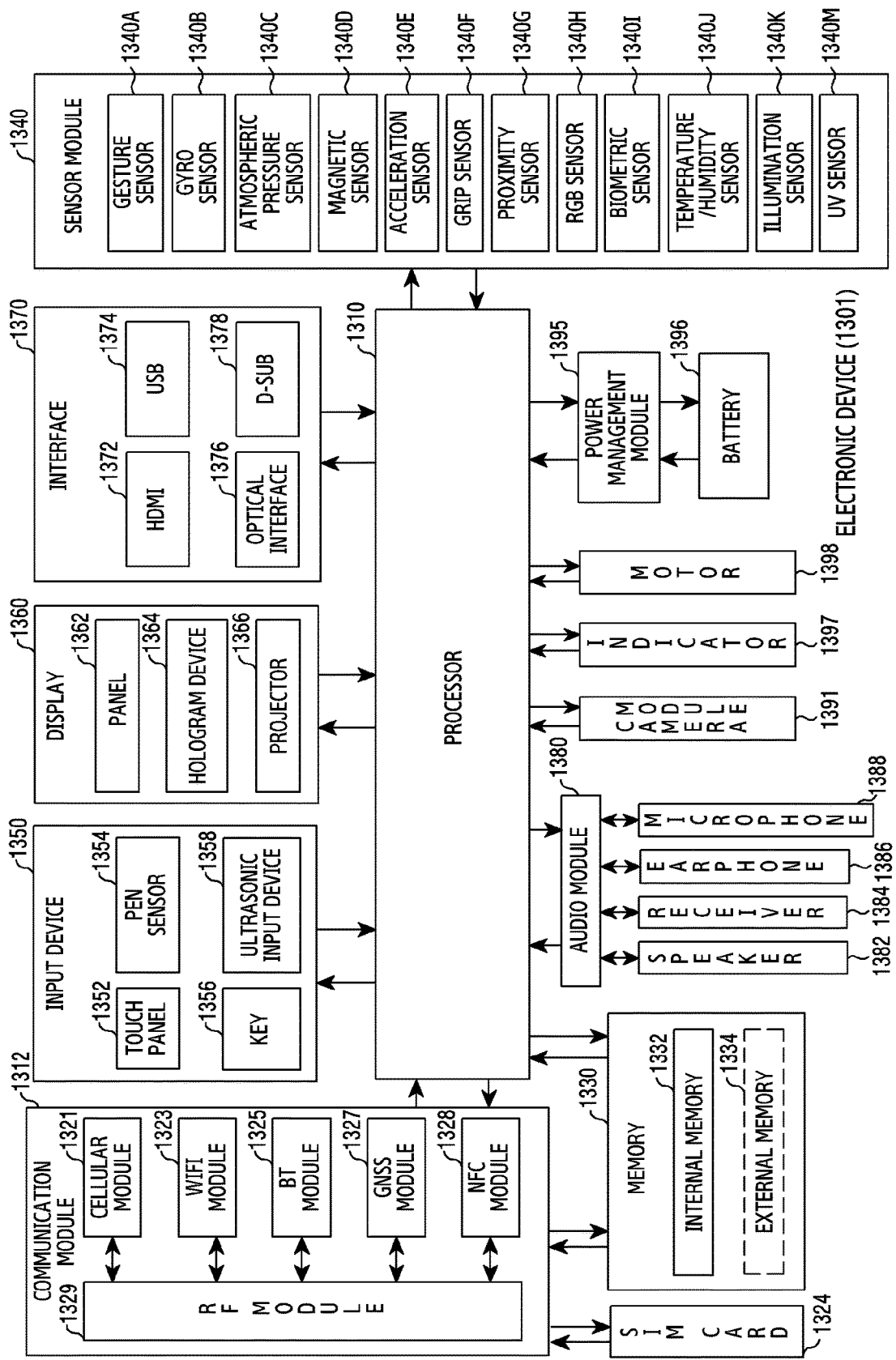
FIG. 13 is a block diagram illustrating an electronic device according to various embodiments of the disclosure.

FIG. 13 is a block diagram illustrating an electronic device 1301 according to various embodiments of the disclosure. The electronic device 1301 may include, for example, all or part of the electronic device 1201 illustrated in FIG. 12. The electronic device 1301 may include one or more processors (for example, APs) 1310, a communication module 1320, a Subscriber Identification Module (SIM) 1324, a memory 1330, a sensor module 1340, an input device 1350, a display 1360, an interface 1370, an audio module 1380, a camera module 1391, a power management module 1395, a battery 1396, an indicator 1397, and a motor 1398. The processors 1310 may run, for example, an operating system or an application to control a plurality of hardware or software components that are connected to the processors 1310, and may perform various kinds of data processing and operations. The processors 1310 may be configured, for example, as a System on Chip (SoC). According to one embodiment, the processors 1310 may further include a Graphic Processing Unit (GPU) and/or an image signal processor. The processors 1310 may include at least some (for example, a cellular module 1321) of the components illustrated in FIG. 13. The processors 1310 may load a command or data received from at least one of other components (for example, a nonvolatile memory) into a volatile memory to process the command or data, and may store resultant data in the nonvolatile memory.

The communication module 1320 may have a configuration that is the same as, or similar to, that of the communication interface 170. The communication module 1320 may include, for example, a cellular module 1321, a Wi-Fi module 1323, a Bluetooth module 1325, a GNSS module 1327, an NFC module 1328, and an RF module 1329. The cellular module 1321 may provide, for example, a voice call, a video call, a text messaging service, or an Internet service through a communication network. According to one embodiment, the cellular module 1321 may perform identification and authentication of the electronic device 1301 in a communication network using a Subscriber Identity Module (SIM, for example, a SIM card) 1324. According to one embodiment, the cellular module 1321 may perform at least some of the functions provided by the processors 1310. According to one embodiment, the cellular module 1321 may include a CP. According to one embodiment, at least some (for example, two or more) of the cellular module 1321, the Wi-Fi module 1323, the Bluetooth module 1325, the GNSS module 1327, or the NFC module 1328 may be included in one Integrated Chip (IC) or IC package. The RF module 1329 may transmit and receive, for example, a communication signal (for example, an RF signal). The RF module 1329 may include, for example, a transceiver, a Power Amplifier (amp) Module (PAM), a frequency filter, a Low-Noise Amplifier (LNA), at least one antenna, or the like. According to another embodiment, at least one of the cellular module 1321, the Wi-Fi module 1323, the Bluetooth module 1325, the GNSS module 1327, or the NFC module 1328 may transmit and receive an RF signal through a separate RF module. The SIM 1324 may include, for example, a card including a SIM or an embedded SIM, and may include unique identification information (for example, an Integrated Circuit Card Identifier (ICCID)) or subscriber information (for example, an International Mobile Subscriber Identity (IMSI)).

The memory 1330 (for example, the memory 1230) may include, for example, an internal memory 1332 or an external memory 1334. The internal memory 1332 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, or a Solid-State Drive (SSD)). The external memory 1334 may include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 1334 may be functionally or physically connected to the electronic device 1301 through various interfaces.

The sensor module 1340 may measure, for example, physical quantities, or may detect the state of operation of the electronic device 1301 and convert measured or detected information into an electrical signal. The sensor module 1340 may include, for example, at least one of a gesture sensor 1340A, a gyro sensor 1340B, a barometric pressure sensor 1340C, a magnetic sensor 1340D, an accelerometer 1340E, a grip sensor 1340F, a proximity sensor 1340G, a color sensor 1340H (for example, a red, green, and blue (RGB) sensor), a biometric sensor 1340I, a temperature/humidity sensor 1340J, an illumination sensor 1340K, and an ultraviolet (UV) sensor 1340M. Additionally or alternatively, the sensor module 1340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit to control at least one or more sensors belonging thereto. In one embodiment, the electronic device 1301 may further include a processor configured, as a part of the processors 1310 or separately from the processors 1310, to control the sensor module 1340, thereby controlling the sensor module 1340 while the processors 1310 are in a sleep state.

The input device 1350 may include, for example, a touch panel 1352, a (digital) pen sensor 1354, a key 1356, or an ultrasonic input device 1358. The touch panel 1352 may be, for example, at least one of an electrostatic type, a pressure-sensitive type, an infrared type, and an ultrasonic type. Further, the touch panel 1352 may further include a control circuit. The touch panel 1352 may further include a tactile layer to provide a user with a tactile response. The (digital) pen sensor 1354 may, for example, be part of the touch panel or may include a separate recognition sheet. The key 1356 may include, for example, a physical button, an optical key, or a keypad. The ultrasonic input device 1358 may detect ultrasonic waves generated in an input tool through a microphone (for example, a microphone 1388) and may identify data corresponding to the detected ultrasonic waves.

The display 1360 (for example, the display 1260) may include a panel 1362, a hologram device 1364, a projector 1366, and/or a control circuit to control these components. The panel 1362 may be configured, for example, to be flexible, transparent, or wearable. The panel 1362 may be formed with the touch panel 1352 in one or more modules. The hologram device 1364 may display a three-dimensional image in the air using light interference. The projector 1366 may project light onto a screen to display an image. The screen may be disposed, for example, inside or outside the electronic device 1301. The interface 1370 may include, for example, an HDMI 1372, a USB 1374, an optical interface 1376, or a D-subminiature (D-sub) interface 1378. The interface 1370 may be included, for example, in the communication interface 1270 illustrated in FIG. 12. Additionally or alternatively, the interface 1370 may include, for example, a Mobile High-Definition Link (MHL) interface, an SD card/MMC interface, or an Infrared Data Association (IrDA) interface.

The audio module 1380 may bidirectionally convert, for example, sound and an electrical signal. At least some components of the audio module 1380 may be included, for example, in the input/output interface 1250 illustrated in FIG. 12. The audio module 1380 may process sound information input or output, for example, through a speaker 1382, a receiver 1384, earphones 1386, or the microphone 1388. The camera module 1391 is a device that takes, for example, a still image and a video. According to one embodiment, the camera module 1391 may include one or more image sensors (for example, a front sensor or a rear sensor), a lens, an Image Signal Processor (ISP), or a flash (for example, an LED, a xenon lamp, or the like). The power management module 1395 may manage, for example, the power of the electronic device 1301. According to one embodiment, the power management module 1395 may include a Power Management Integrated Circuit (PMIC), a charger IC, or a battery or fuel gauge. The PMIC may have wired and/or wireless charging methods. The wireless charging methods may include, for example, a magnetic-resonance method, a magnetic-induction method, or an electromagnetic-wave method, and may further include an additional circuit for wireless charging, such as a coil loop, a resonance circuit, or a rectifier. The battery gauge may measure, for example, the remaining battery charge, the charging voltage, the current, or temperature of the battery 1396. The battery 1396 may include, for example, a rechargeable battery and/or a solar battery.

The indicator 1397 may display the specific state of the electronic device 1301 or a component thereof (for example, the processors 1310), which may be, for example, a booting state, a message state, or a charging state. The motor 1398 may convert an electrical signal into mechanical vibrations, and may generate vibrations or a haptic effect. The electronic device 1301 may include a mobile-TV-supporting device (for example, a GPU) that is capable of processing media data in accordance with, for example, Digital Multimedia Broadcasting (DMB), Digital Video Broadcasting (DVB), or MediaFlo™ standards. Each element mentioned in this document may include one or more components, and may be designated by different terms depending on the type of the electronic device. In various embodiments, an electronic device (for example, the electronic device 1301) may be configured such that some elements are omitted, additional elements are further included, or some of the elements are combined into one entity, which may perform the same functions as those of the corresponding elements before combination.

Figure 14:
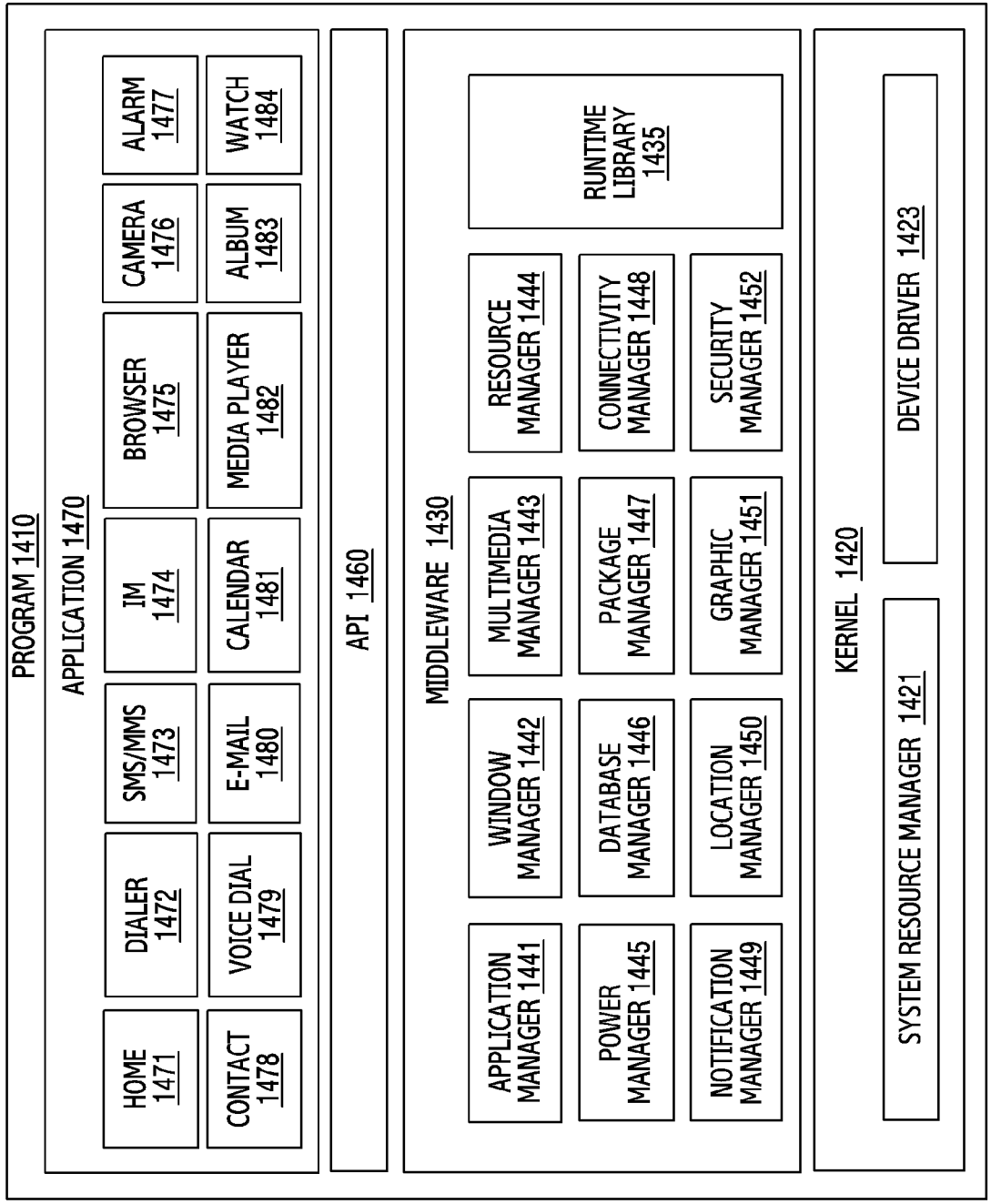
FIG. 14 is a block diagram illustrating a program module according to various embodiments of the disclosure.

FIG. 14 is a block diagram illustrating a program module according to various embodiments of the disclosure. According to one embodiment, the program module 1410 (for example, the program 1240) may include an operating system that controls resources related to an electronic device (for example, the electronic device 1201) and/or various applications (for example, the application 1247) that run on the operating system. The operating system may include, for example, Android™, iOS™, Windows™, Symbian™, Tizen™, Bada™, or the like. Referring to FIG. 14, the program module 1410 may include a kernel 1420 (for example, the kernel 1241), middleware 1430 (for example, the middleware 1243), an API 1460 (for example, the API 1245), and/or an application 1470 (for example, the application 1247). At least part of the program module 1410 may be preloaded onto the electronic device or may be downloaded from an external electronic device (for example, the electronic device 1202 or 1204, the server 1206, or the like).

The kernel 1420 may include, for example, a system resource manager 1421 and/or a device driver 1423. The system resource manager 1421 may perform control, allocation, or recovery of system resources. According to one embodiment, the system resource manager 1421 may include a process manager, a memory manager, or a file-system manager. The device driver 1423 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 1430 may provide, for example, functions commonly needed for applications 1470, or may provide an application 1470 with various functions through the API 1460 so that the application 1470 may use the limited system resources in the electronic device. According to one embodiment, the middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, and a security manager 1452.

The runtime library 1435 may include, for example, a library module used by a complier to add a new function through a programming language while the application 1470 is running. The runtime library 1435 may perform input/output management, memory management, or arithmetic function processing. The application manager 1441 may manage, for example, the life cycle of the application 1470. The window manager 1442 may manage Graphic User Interface (GUI) resources used for a screen. The multimedia manager 1443 may identify formats that are necessary to play media files, and may encrypt or decrypt a media file using a codec suitable for a corresponding format. The resource manager 1444 may manage source code or memory space for the application 1470. The power manager 1445 may manage, for example, the capacity or power supply of a battery and may provide information on power necessary for the operation of the electronic device. According to one embodiment, the power manager 1445 may interwork with a Basic Input/Output System (BIOS). The database manager 1446 may generate, retrieve, or change a database to be used for, for example, the application 1470. The package manager 1447 may manage the installation or updating of an application distributed in the form of a package file.

The connectivity manager 1448 may manage, for example, wireless connectivity. The notification manager 1449 may provide a user with an event, for example, an incoming message, an appointment, and a proximity notification. The location manager 1450 may manage, for example, information about the location of the electronic device. The graphic manager 1451 may manage, for example, a graphic effect to be provided for the user or a user interface related to the graphic effect. The security manager 1452 may provide, for example, system security or user authentication. According to one embodiment, the middleware 1430 may include a telephony manager to manage a voice or video call function of the electronic device or a middleware module that is capable of forming combinations of functions of the foregoing elements. According to one embodiment, the middleware 1430 may provide a specialized module for each operating system. The middleware 1430 may dynamically delete some of the existing elements or add new elements. The API 1460 is, for example, a set of API programming functions, and may be provided with a different configuration depending on the operating system. For example, one API set for each platform may be provided in Android or iOS, while two or more API sets for each platform may be provided in Tizen.

The application 1470 may include, for example, a home screen 1471, a dialer 1472, an SMS/MMS 1473, Instant Messaging (IM) 1474, a browser 1475, a camera 1476, an alarm 1477, an address book 1478, a voice dialer 1479, email 1480, a calendar 1481, a media player 1482, an album 1483, a clock 1484, a healthcare application (for example, for measuring exercising or blood sugar), or an environmental data application (for example, for providing atmospheric pressure, humidity, or temperature data). According to one embodiment, the application 1470 may include an information exchange application that is capable of supporting information exchange between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device, or may receive notification information from the external electronic device and provide the notification information to the user. The device management application may install, delete, or update, for example, a function (for example, a function of turning on/turning off the external electronic device itself (or some components thereof) or adjusting the brightness (or resolution) of a display) of an external electronic device communicating with the electronic device or an application operating in the external electronic device. According to one embodiment, the application 1470 may include an application (for example, a healthcare application of a mobile medical device) assigned according to the attributes of the external electronic device. According to one embodiment, the application 1470 may include an application received from the external electronic device. At least part of the program module 1410 may be implemented (for example, run) by software, firmware, hardware (for example, the processors 1310), or combinations of at least two or more thereof, and may include a module, a program, a routine, sets of instructions, or a process to perform one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 1230) in the form of a program module. The instruction, when executed by a processor (e.g., the processor 1220), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

As described above, an electronic device according to various embodiments of the disclosure may include: a modem; at least one sensor; and at least one processor configured to be connected to the modem and the at least one sensor, to determine the distance between the electronic device and a user of the electronic device during execution of a call application, to determine the output strength of audio data received from a different electronic device connected via the call application as an output strength corresponding to the determined distance, and to control outputting the audio data with the determined output strength.

In some embodiments, the at least one processor may be configured to: determine the distance between the electronic device and the user of the electronic device when a mode of the executed call application is a speakerphone mode; determine the output strength of the audio data received from the different electronic device connected via the call application as the output strength corresponding to the determined distance; and control outputting the audio data with the determined output strength through a speaker of the electronic device. Further, the at least one processor may be further configured to: determine the distance between a receiver of the electronic device and an ear of the user when the mode of the executed call application is a normal mode; and switch the mode of the call application from the normal mode to the speakerphone mode when the distance between the receiver and the ear of the user is equal to or greater than a threshold value. The at least one sensor may include one or more of a temperature sensor, a proximity sensor, an image sensor, or a gyro sensor, and the at least one processor may be configured to determine the distance between the receiver and the ear of the user on the basis of data detected using the at least one sensor. The at least one processor may be configured to: identify whether the electronic device is located in a designated area when the distance between the receiver and the ear of the user is equal to or greater than the threshold value; and switch the mode of the call application from the normal mode to the speakerphone mode upon identifying that the electronic device is located in the designated area. The at least one processor is configured to: identify whether the electronic device may be located in the designated area using a Global Positioning System (GPS) of the electronic device; and switch the mode of the call application from the normal mode to the speakerphone mode upon identifying that the electronic device is located in the designated area. The at least one processor may be configured to: identify a relay node connected with the electronic device for data communication when the distance between the receiver and the ear of the user is equal to or greater than the threshold value; and switch the mode of the call application from the normal mode to the speakerphone mode when the identified relay node is a designated node.

In some embodiments, the electronic device may further include: a display configured to be connected with the at least one processor, wherein the at least one processor may be further configured to: identify whether the audio data received via a microphone of the electronic device includes a designated word when a mode of the call application is a speakerphone mode; execute an application related to the designated word when the audio data includes the designated word; and control displaying a first User Interface (UI) for the executed application along with a second UI for the call application. The at least one processor may be configured to: detect input to move at least one object in the displayed first UI to the displayed second UI; and control transmitting content linked to the at least one object to the different electronic device on the basis of detection.

In some embodiments, the at least one processor may be further configured to: revise the audio data received via the microphone of the electronic device on the basis of the determined distance between the electronic device and the user of the electronic device; and control transmitting the revised audio data to the different electronic device.

In some embodiments, the at least one processor may be further configured to: identify whether different audio data to control the output strength of the audio data is received via a microphone of the electronic device when a mode of the call application is a speakerphone mode; and adjust an output strength of a speaker upon identifying that the different audio data to control the output strength is received.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. An electronic device comprising:
a modem;
at least one sensor;
a microphone; and at least one processor configured to be connected with the modem, the at least one sensor and the microphone, wherein the at least one processor configured to:
  activate the at least one sensor during execution of a call application;
  determine a distance between the electronic device and a user of the electronic device based on data obtained by the activated at least one sensor;
  identify an environment using first audio data received via the microphone;
  determine an output strength of second audio data, which is received from a different electronic device connected via the call application, as an output strength corresponding to at least one of the determined distance or the identified environment from among output strengths recoded in a predetermine table; and
  control outputting the second audio data to the user with the determined output strength.

2. The electronic device of claim 1, wherein the at least one processor is configured to:
  control outputting the second audio data with the determined output strength through a speaker of the electronic device when a mode of the executed call application is a speakerphone mode.

3. The electronic device of claim 2, wherein the at least one processor is further configured to:
  when the mode of the executed call application is a normal mode, switch the mode of the call application from the normal mode to the speakerphone mode when the determined distance is equal to or greater than a threshold value.

4. The electronic device of claim 3,
  wherein the at least one sensor comprises one or more of a temperature sensor, a proximity sensor, an image sensor, or a gyro sensor.

5. The electronic device of claim 3, wherein the at least one sensor is configured to:
  identify whether the electronic device is located in a designated area when the determined distance is equal to or greater than the threshold value; and
  switch the mode of the call application from the normal mode to the speakerphone mode upon identifying that the electronic device is located in the designated area.

6. The electronic device of claim 5, wherein the at least one processor is configured to:
  identify whether the electronic device is located in the designated area using a global positioning system (GPS) of the electronic device; and
  switch the mode of the call application from the normal mode to the speakerphone mode upon identifying that the electronic device is located in the designated area.

7. The electronic device of claim 3, wherein the at least one processor is configured to:
  identify a relay node connected with the electronic device for data communication when the determined distance is equal to or greater than the threshold value; and
  switch the mode of the call application from the normal mode to the speakerphone mode when the identified relay node is a designated node.

8. The electronic device of claim 1, further comprising:
  a display configured to be connected with the at least one processor,
  wherein the at least one processor is further configured to:
  identify whether the first audio data comprises a designated word when a mode of the call application is a speakerphone mode;
  execute an application related to the designated word when the first audio data comprises the designated word; and
  control displaying a first user interface (UI) for the executed application along with a second UI for the call application on the display.

9. The electronic device of claim 8, wherein the at least one processor is further configured to:
  detect input to move at least one object in the displayed first UI to the displayed second UI; and
  control transmitting content linked to the at least one object to the different electronic device based on the detected input.

10. The electronic device of claim 1, wherein the at least one processor is further configured to:
  revise the first audio data received via the microphone of the electronic device based on the determined distance; and
  control transmitting the revised first audio data to the different electronic device.

11. The electronic device of claim 1, wherein the at least one processor is further configured to:
  identify whether different audio data to control the output strength of the first audio data is received via the microphone of the electronic device when a mode of the call application is a speakerphone mode; and
  adjust an output strength of a speaker of the electronic device upon identifying that the different audio data to control the output strength is received.

12. The electronic device of claim 1, wherein the at least one processor is configured to:
  determine a beam direction to receive the first audio data based on the identified environment and the data obtained by the activated at least one sensor; and
  control receiving the first audio data through the microphone in the determined beam direction.

13. A method of an electronic device comprising:
  activating at least one sensor during execution of a call application;
  determining a distance between the electronic device and a user of the electronic device based on data obtained by the activated at least one sensor;
  identifying an environment using first audio data received via a microphone;
  determining an output strength of second audio data, which is received from a different electronic device connected via the call application as an output strength corresponding to at least one of the determined distance or the identified environment from among output strengths recoded in a predetermine table; and
  outputting the second audio data with the determined output strength.

14. The method of claim 13, further comprises outputting the second audio data with the determined output strength through a speaker of the electronic device when a mode of the executed call application is a speakerphone mode.

15. The method of claim 14, further comprising:
  when the mode of the executed call application is a normal mode, switching the mode of the call application from the normal mode to the speakerphone mode when the determined distance is equal to or greater than a threshold value.

16. The method of claim 15, wherein the switching of the mode of the call application comprises:
  identifying whether the electronic device is located in a designated area when the determined distance is equal to or greater than the threshold value; and switching the mode of the call application from the normal mode to the speakerphone mode upon identifying that the electronic device is located in the designated area.

17. The method of claim 16, further comprising:
identifying whether the electronic device is located in the designated area using a global positioning system (GPS) of the electronic device; and
switching the mode of the call application from the normal mode to the speakerphone mode upon identifying that the electronic device is located in the designated area.

18. The method of claim 13, further comprising:
identifying a relay node connected with the electronic device for data communication when the determined distance is equal to or greater than a threshold value; and
switching a mode of the call application from a normal mode to a speakerphone mode when the identified relay node is a designated node.

19. The method of claim 13, further comprising:
identifying whether the first audio data comprises a designated word when a mode of the call application is a speakerphone mode;
executing an application related to the designated word when the first audio data comprises the designated word; and
displaying a first user interface (UI) for the executed application along with a second UI for the call application on the display.

20. The method of claim 13, further comprising:
revising the first audio data received via the microphone of the electronic device based on the determined distance; and
transmitting the revised first audio data to the different electronic device.

21. The method of claim 12, further comprising:
identifying whether different audio data to control the output strength of the first audio data is received via the microphone of the electronic device when a mode of the call application is a speakerphone mode; and
adjusting an output strength of a speaker of the electronic device upon identifying that the different audio data to control the output strength is received.

22. The method of claim 13, further comprising:
determining a beam direction to receive the first audio data based on the identified environment and the data obtained by the activated at least one sensor; and
receiving the first audio data through the microphone in the determined beam direction.

* * * * *